(12) United States Patent
Kadlec et al.

(10) Patent No.: US 12,571,914 B2
(45) Date of Patent: Mar. 10, 2026

(54) SYSTEMS AND METHODS OF LIDAR SENSOR SYSTEMS HAVING AMPLIFIER PROTECTION CIRCUITS

(71) Applicant: Aurora Operations, Inc., Mountain View, CA (US)

(72) Inventors: Emil Kadlec, Bozeman, MT (US); Mark Lund, Bozeman, MT (US); Justin Torgerson, Bozeman, MT (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 337 days.

(21) Appl. No.: 18/481,695

(22) Filed: Oct. 5, 2023

(65) Prior Publication Data

US 2025/0116773 A1    Apr. 10, 2025

(51) Int. Cl.
*G01S 17/04* (2020.01)

(52) U.S. Cl.
CPC .................................. *G01S 17/04* (2020.01)

(58) Field of Classification Search
CPC .......... G01S 17/04; G01S 7/497; G01S 17/34; G01S 17/931
See application file for complete search history.

(56) References Cited

U.S. PATENT DOCUMENTS

| | | | |
|---|---|---|---|
| 4,099,249 A | 7/1978 | Casasent |
| 4,620,192 A | 10/1986 | Collins |
| 4,648,276 A | 3/1987 | Klepper et al. |

| | | | |
|---|---|---|---|
| 4,804,893 A | 2/1989 | Melocik |
| 5,075,864 A | 12/1991 | Sakai |
| 5,216,534 A | 6/1993 | Boardman et al. |
| 5,223,986 A | 6/1993 | Mayerjak et al. |
| 5,227,910 A | 7/1993 | Khattak |
| 5,231,401 A | 7/1993 | Kaman et al. |
| 5,687,017 A | 11/1997 | Katoh et al. |
| 5,781,156 A | 7/1998 | Krasner |
| 5,828,585 A | 10/1998 | Welk et al. |
| 5,947,903 A | 9/1999 | Ohtsuki et al. |
| 5,999,302 A | 12/1999 | Sweeney et al. |

(Continued)

FOREIGN PATENT DOCUMENTS

| | | |
|---|---|---|
| CN | 101346773 A | 1/2009 |
| CN | 102150007 A | 8/2011 |

(Continued)

OTHER PUBLICATIONS

Office Action issued in connection with Chinese Appl. No. 202310820368.1 dated Feb. 28, 2024.

(Continued)

*Primary Examiner* — Seung C Sohn
(74) *Attorney, Agent, or Firm* — Dority & Manning, P.A.

(57) ABSTRACT

A light detection and ranging sensor system includes a laser source configured to output a source beam; a modulator configured to receive a modulation signal and modulate the source beam based on the modulation signal to produce a modulated beam; an amplifier configured to amplify the modulated beam; and a protection circuit configured to detect, by evaluating at least one of the modulation signal or a parameter of the modulated beam, a condition associated with the modulated beam; and control input of the modulated beam to the amplifier in response to detecting the condition.

20 Claims, 9 Drawing Sheets

(56) References Cited

U.S. PATENT DOCUMENTS

| | | | |
|---|---|---|---|
| 6,029,496 A | 2/2000 | Kreft | |
| 6,211,888 B1 | 4/2001 | Ohtsuki et al. | |
| 6,671,595 B2 | 12/2003 | Lu et al. | |
| 6,753,950 B2 | 6/2004 | Morcom | |
| 6,871,148 B2 | 3/2005 | Morgen et al. | |
| 6,931,055 B1 | 8/2005 | Underbrink et al. | |
| 7,122,691 B2 | 10/2006 | Oshima et al. | |
| 7,152,490 B1 | 12/2006 | Freund et al. | |
| 7,486,802 B2 | 2/2009 | Hougen | |
| 7,511,824 B2 | 3/2009 | Sebastian et al. | |
| 7,639,347 B2 | 12/2009 | Eaton | |
| 7,742,152 B2 | 6/2010 | Hui et al. | |
| 7,917,039 B1 | 3/2011 | Delfyett | |
| 8,135,513 B2 | 3/2012 | Bauer et al. | |
| 8,531,650 B2 | 9/2013 | Feldkhun et al. | |
| 8,751,155 B2 | 6/2014 | Lee | |
| 8,805,197 B2 | 8/2014 | Delfyett | |
| 8,818,609 B1 | 8/2014 | Boyko et al. | |
| 8,831,780 B2 | 9/2014 | Zelivinski et al. | |
| 8,954,252 B1 | 2/2015 | Urmson et al. | |
| 9,041,915 B2 | 5/2015 | Earhart et al. | |
| 9,046,909 B2 | 6/2015 | Leibowitz et al. | |
| 9,086,273 B1 | 7/2015 | Gruver et al. | |
| 9,097,800 B1 | 8/2015 | Zhu | |
| 9,348,137 B2 | 5/2016 | Plotkin et al. | |
| 9,383,753 B1 | 7/2016 | Templeton et al. | |
| 9,607,220 B1 | 3/2017 | Smith et al. | |
| 9,618,742 B1 | 4/2017 | Droz et al. | |
| 9,753,462 B2 | 9/2017 | Gilliland et al. | |
| 10,036,812 B2 | 7/2018 | Crouch et al. | |
| 10,231,705 B2 | 3/2019 | Lee | |
| 10,345,434 B2 | 7/2019 | Hinderling et al. | |
| 10,422,649 B2 | 9/2019 | Engelman et al. | |
| 10,485,508 B2 | 11/2019 | Miyaji et al. | |
| 10,520,602 B2 | 12/2019 | Villeneuve et al. | |
| 10,534,084 B2 | 1/2020 | Crouch et al. | |
| 10,568,258 B2 | 2/2020 | Wahlgren | |
| 10,571,567 B2 | 2/2020 | Campbell et al. | |
| 11,002,856 B2 | 5/2021 | Heidrich et al. | |
| 11,016,197 B1 * | 5/2021 | Barber | G01S 17/931 |
| 11,041,954 B2 | 6/2021 | Crouch et al. | |
| 11,249,192 B2 | 2/2022 | Crouch et al. | |
| 11,402,506 B2 | 8/2022 | Ohtomo et al. | |
| 11,441,899 B2 | 9/2022 | Pivac et al. | |
| 2002/0071109 A1 | 6/2002 | Allen et al. | |
| 2002/0140924 A1 | 10/2002 | Wangler et al. | |
| 2003/0117312 A1 | 6/2003 | Nakanishi et al. | |
| 2004/0034304 A1 | 2/2004 | Sumi | |
| 2004/0109155 A1 | 6/2004 | Deines | |
| 2004/0158155 A1 | 8/2004 | Njemanze | |
| 2004/0222366 A1 | 11/2004 | Frick | |
| 2005/0149240 A1 | 7/2005 | Tseng et al. | |
| 2006/0132752 A1 | 6/2006 | Kane | |
| 2006/0239312 A1 | 10/2006 | Kewitsch et al. | |
| 2007/0005212 A1 | 1/2007 | Xu et al. | |
| 2008/0018881 A1 | 1/2008 | Hui et al. | |
| 2008/0024756 A1 | 1/2008 | Rogers | |
| 2008/0040029 A1 | 2/2008 | Breed | |
| 2008/0100822 A1 | 5/2008 | Munro | |
| 2009/0002679 A1 | 1/2009 | Ruff et al. | |
| 2009/0009842 A1 | 1/2009 | Destain et al. | |
| 2009/0030605 A1 | 1/2009 | Breed | |
| 2010/0094499 A1 | 4/2010 | Anderson | |
| 2010/0183309 A1 | 7/2010 | Etemad et al. | |
| 2010/0188504 A1 | 7/2010 | Dimsdale et al. | |
| 2010/0312432 A1 | 12/2010 | Hamada et al. | |
| 2011/0007299 A1 | 1/2011 | Moench et al. | |
| 2011/0015526 A1 | 1/2011 | Tamura | |
| 2011/0026007 A1 | 2/2011 | Gammenthaler | |
| 2011/0026008 A1 | 2/2011 | Gammenthaler | |
| 2011/0205523 A1 | 8/2011 | Rezk et al. | |
| 2011/0292371 A1 | 12/2011 | Chang | |
| 2012/0038902 A1 | 2/2012 | Dotson | |
| 2012/0127252 A1 | 5/2012 | Lim et al. | |
| 2012/0229627 A1 | 9/2012 | Wang | |

| | | | |
|---|---|---|---|
| 2012/0274922 A1 | 11/2012 | Hodge | |
| 2012/0281907 A1 | 11/2012 | Samples et al. | |
| 2012/0306383 A1 | 12/2012 | Munro | |
| 2013/0120989 A1 | 5/2013 | Sun et al. | |
| 2013/0268163 A1 | 10/2013 | Comfort et al. | |
| 2013/0325244 A1 | 12/2013 | Wang et al. | |
| 2014/0036252 A1 | 2/2014 | Amzajerdian et al. | |
| 2014/0064607 A1 | 3/2014 | Grossmann et al. | |
| 2015/0005993 A1 | 1/2015 | Breuing | |
| 2015/0046119 A1 | 2/2015 | Sandhawalia et al. | |
| 2015/0130607 A1 | 5/2015 | Macarthur | |
| 2015/0160332 A1 | 6/2015 | Sebastian et al. | |
| 2015/0177379 A1 | 6/2015 | Smith et al. | |
| 2015/0185244 A1 | 7/2015 | Inoue et al. | |
| 2015/0260836 A1 | 9/2015 | Hayakawa | |
| 2015/0267433 A1 | 9/2015 | Leonessa et al. | |
| 2015/0269438 A1 | 9/2015 | Samarasekera et al. | |
| 2015/0270838 A1 | 9/2015 | Chan et al. | |
| 2015/0282707 A1 | 10/2015 | Tanabe et al. | |
| 2015/0323660 A1 | 11/2015 | Hampikian | |
| 2015/0331103 A1 | 11/2015 | Jensen | |
| 2015/0331111 A1 | 11/2015 | Newman et al. | |
| 2016/0078303 A1 | 3/2016 | Samarasekera et al. | |
| 2016/0084946 A1 | 3/2016 | Turbide | |
| 2016/0091599 A1 | 3/2016 | Jenkins | |
| 2016/0123720 A1 | 5/2016 | Thorpe et al. | |
| 2016/0125739 A1 | 5/2016 | Stewart et al. | |
| 2016/0216366 A1 | 7/2016 | Phillips et al. | |
| 2016/0245903 A1 | 8/2016 | Kalscheur et al. | |
| 2016/0260324 A1 | 9/2016 | Tummala et al. | |
| 2016/0266243 A1 | 9/2016 | Marron | |
| 2016/0274589 A1 | 9/2016 | Templeton et al. | |
| 2016/0350926 A1 | 12/2016 | Flint et al. | |
| 2016/0377721 A1 | 12/2016 | Lardin et al. | |
| 2016/0377724 A1 | 12/2016 | Crouch et al. | |
| 2017/0160541 A1 | 6/2017 | Carothers et al. | |
| 2017/0248691 A1 | 8/2017 | Mcphee et al. | |
| 2017/0299697 A1 | 10/2017 | Swanson | |
| 2017/0329014 A1 | 11/2017 | Moon et al. | |
| 2017/0329332 A1 | 11/2017 | Pilarski et al. | |
| 2017/0343652 A1 | 11/2017 | De Mersseman et al. | |
| 2017/0350964 A1 | 12/2017 | Kaneda | |
| 2017/0350979 A1 | 12/2017 | Uyeno et al. | |
| 2017/0356983 A1 | 12/2017 | Jeong et al. | |
| 2018/0003805 A1 | 1/2018 | Popovich et al. | |
| 2018/0136000 A1 | 5/2018 | Rasmusson et al. | |
| 2018/0188355 A1 | 7/2018 | Bao et al. | |
| 2018/0224547 A1 | 8/2018 | Crouch et al. | |
| 2018/0267556 A1 | 9/2018 | Templeton et al. | |
| 2018/0276986 A1 | 9/2018 | Delp | |
| 2018/0284286 A1 | 10/2018 | Eichenholz et al. | |
| 2018/0299534 A1 | 10/2018 | Lachapelle et al. | |
| 2018/0307913 A1 | 10/2018 | Finn et al. | |
| 2019/0064831 A1 | 2/2019 | Gali et al. | |
| 2019/0086514 A1 | 3/2019 | Dussan et al. | |
| 2019/0107606 A1 | 4/2019 | Russell et al. | |
| 2019/0154439 A1 | 5/2019 | Binder | |
| 2019/0154832 A1 | 5/2019 | Maleki et al. | |
| 2019/0154835 A1 | 5/2019 | Maleki et al. | |
| 2019/0258251 A1 | 8/2019 | Ditty et al. | |
| 2019/0317219 A1 | 10/2019 | Smith et al. | |
| 2019/0318206 A1 | 10/2019 | Smith et al. | |
| 2019/0346856 A1 | 11/2019 | Berkemeier et al. | |
| 2019/0361119 A1 | 11/2019 | Kim et al. | |
| 2020/0025879 A1 | 1/2020 | Pacala et al. | |
| 2020/0049819 A1 | 2/2020 | Cho et al. | |
| 2021/0089047 A1 | 3/2021 | Smith et al. | |
| 2021/0165102 A1 | 6/2021 | Crouch et al. | |
| 2021/0325664 A1 | 10/2021 | Adams et al. | |
| 2022/0260686 A1 | 8/2022 | Wang et al. | |
| 2022/0413260 A1 | 12/2022 | Gassend et al. | |
| 2023/0081609 A1 * | 3/2023 | Halbritter | G01S 7/4808 356/4.01 |

FOREIGN PATENT DOCUMENTS

| | | |
|---|---|---|
| CN | 103227559 A | 7/2013 |
| CN | 103608696 A | 2/2014 |
| CN | 104793619 A | 7/2015 |

(56) References Cited

FOREIGN PATENT DOCUMENTS

| CN | 104914445 A | 9/2015 |
|----|-------------|--------|
| CN | 104956400 A | 9/2015 |
| CN | 105116922 A | 12/2015 |
| CN | 105425245 A | 3/2016 |
| CN | 105629258 A | 6/2016 |
| CN | 105652282 A | 6/2016 |
| CN | 107015238 A | 8/2017 |
| CN | 107193011 A | 9/2017 |
| CN | 207318710 U | 5/2018 |
| DE | 10 2007 001 103 A1 | 7/2008 |
| DE | 10 2017 200 692 A1 | 8/2018 |
| EP | 1 298 453 A2 | 4/2003 |
| EP | 3 330 766 A1 | 6/2018 |
| FR | 2568688 A1 | 2/1986 |
| GB | 2 349 231 A | 10/2000 |
| JP | S63-071674 A | 4/1988 |
| JP | H06-148556 A | 5/1994 |
| JP | H09-257415 A | 10/1997 |
| JP | 2765767 B2 | 6/1998 |
| JP | H11-153664 A | 6/1999 |
| JP | 2000-338244 A | 12/2000 |
| JP | 2002-249058 A | 9/2002 |
| JP | 3422720 B2 | 6/2003 |
| JP | 2003-185738 A | 7/2003 |
| JP | 2006-148556 A | 6/2006 |
| JP | 2006-226931 A | 8/2006 |
| JP | 2007-155467 A | 6/2007 |
| JP | 2007-214564 A | 8/2007 |
| JP | 2007-214694 A | 8/2007 |
| JP | 2009-257415 A | 11/2009 |
| JP | 2009-291294 A | 12/2009 |
| JP | 2011-044750 A | 3/2011 |
| JP | 2011-107165 A | 6/2011 |
| JP | 2011-203122 A | 10/2011 |
| JP | 2012-502301 A | 1/2012 |
| JP | 2012-103118 A | 5/2012 |
| JP | 2012-154863 A | 8/2012 |
| JP | 2015-125062 A | 7/2015 |
| JP | 2015-172510 A | 10/2015 |
| JP | 2015-212942 A | 11/2015 |
| JP | 2018-173346 A | 11/2018 |
| JP | 2018-204970 A | 12/2018 |
| KR | 2018-0058068 A | 5/2018 |
| KR | 2018-0126927 A | 11/2018 |
| TW | 201516612 A | 5/2015 |
| TW | 201818183 A | 5/2018 |
| TW | 201832039 A | 9/2018 |
| TW | 201833706 A | 9/2018 |
| TW | 202008702 A | 2/2020 |
| WO | WO-2007/124063 A2 | 11/2007 |
| WO | WO-2010/127151 A2 | 11/2010 |
| WO | WO-2011/102130 A1 | 8/2011 |
| WO | WO-2014/011241 A2 | 1/2014 |
| WO | WO-2014/132020 A1 | 9/2014 |
| WO | WO-2015/037173 A1 | 3/2015 |
| WO | WO-2016/134321 A1 | 8/2016 |
| WO | WO-2016/164435 A1 | 10/2016 |
| WO | WO-2017/018065 A1 | 2/2017 |
| WO | WO-2018/066069 A1 | 4/2018 |
| WO | WO-2018/067158 A1 | 4/2018 |
| WO | WO-2018/102188 A1 | 6/2018 |
| WO | WO-2018/102190 A1 | 6/2018 |
| WO | WO-2018/107237 A1 | 6/2018 |
| WO | WO-2018/125438 A2 | 7/2018 |
| WO | WO-2018/144853 A1 | 8/2018 |
| WO | WO-2018/160240 A2 | 9/2018 |
| WO | WO-2019/014177 A1 | 1/2019 |
| WO | WO-2020/062301 A1 | 4/2020 |

OTHER PUBLICATIONS

Adany, P. et al., "Chirped Lidar Using Simplified Homodyne Detection," Journal of Lightwave Technology, vol. 27, No. 16, Aug. 15, 2009, pp. 3351-3357.

Anonymous, "Fundamentals of Direct Digital Synthesis," Analog Devices, MT-085 Tutorial Rev. D, copyright 2009, pp. 1-9.

Anonymous, "Occlusion—Shadows and Occlusion—Peachpit", Jul. 3, 2006 (Jul. 3, 2006), P055697780,Retrieved from the Internet: URL: https://www.peachpit.com/articles/article.aspx?p=486505&seqNum=7[retrieved on May 25, 2020] 2 pages.

Aull, B. et al., "Geiger-Mode Avalanche Photodiodes for Three-Dimensional Imaging," Lincoln Laboratory Journal, vol. 13, No. 2, 2002, pp. 335-350.

Bashkansky, M. et al., "RF phase-coded random-modulation LIDAR," Optics Communications, vol. 231, 2004, pp. 93-98.

Beck, S. et al., "Synthetic-aperture imaging laser radar: laboratory demonstration and signal processing," Applied Optics, vol. 44, No. 35, Dec. 10, 2005, pp. 7621-7629.

Berkovic, G. and Shafir, E., "Optical methods for distance and displacement measurements", Advances in Optics and Photonics, vol. 4, Issue 4, Dec. 2012, pp. 441-471.

Besl, P. and Mckay, N., "A Method for Registration of 3-D shapes", IEEE Transactions on Pattern Analysis and Machine Intelligence, vol. 14, No. 2, Feb. 1992, pp. 239-256.

Campbell, J. et al., "Super-resolution technique for CW lidar using Fourier transform reordering and Richardson-Lucy deconvolution." Optics Letters, vol. 39, No. 24, Dec. 15, 2014, pp. 6981-6984.

Cao, X. et al., "Lidar Signal Depolarization by Solid Targets and its Application to Terrain Mapping and 3D Imagery," Defence R&D, Contract Report DRDC Valcartier CR 2011-236, Mar. 2011, retrieved at URL:http://publications.gc.ca/collections/collection_2016/rddc-drdc/D68-3-236-2011-eng.pdf, pp. 1-74.

Cheng, H., "Autonomous Intelligent Vehicles: Theory, Algorithms, and Implementation", copyright 2011, Springer, retrieved from http://ebookcentral.proquest.com, created from epo-ebooks on Jun. 1, 2020, 24 pages.

Chester, David B. "A Parameterized Simulation of Doppler Lidar", All Graduate Thesis and Dissertions, Dec. 2017, Issue 6794, <URL: https://digitalcommons.usu.edu/etd/6794 > *pp. 13-14, 27-28, 45*.

Chinese Office Action issued in related CN Appl. Ser. No. 201780081804.0 dated Dec. 1, 2022 (20 pages).

Chinese Office Action on CN Appl. Ser. No. 201880009947.5 dated Oct. 11, 2021 (5 pages).

Contu, F., "The Do's and Don'ts of High Speed Serial Design in FPGA's". Xilinix All Programmable, Copyright 2013, High Speed Digital Design & Validation Seminars 2013, pp. 1-61.

Corrected Notice of Allowance on U.S. Appl. No. 16/725,419 dated May 28, 2020 (2 pages).

Crouch, S. and Barber, Z., "Laboratory demonstrations of interferometric and spotlight synthetic aperture ladar techniques," Optics Express, vol. 20, No. 22, Oct. 22, 2012, pp. 24237-24246.

Crouch, S. et al., "Three dimensional digital holographic aperture synthesis", Optics Express, vol. 23, No. 18, Sep. 7, 2015, pp. 23811-23816.

Dapore, B. et al., "Phase noise analysis of two wavelength coherent imaging system", Optics Express, vol. 21, No. 25, Dec. 16, 2013, pp. 30642-30652.

Decision of Rejection on JP Appl. Ser. No. 2019-527155 dated Jun. 8, 2021 (8 pages).

Decision of Rejection on JP Appl. Ser. No. 2020-559530 dated Aug. 31, 2021 (13 pages).

Duncan, B. and Dierking, M., "Holographic aperture ladar: erratum", Applied Optics, vol. 52, No. 4, Feb. 1, 2013, pp. 706-708.

Duncan, B. et al., "Holographic aperture ladar", Applied Optics, vol. 48, Issue 6, Feb. 20, 2009, pp. 1168-1177.

El Gayar, N. (Ed.) et al., "Multiple Classifier Systems", 9th International Workshop, International Workshop on Multiple Classifier Systems, MCS 2010, Cairo, Egypt, Apr. 7-9, 2010, specifically Farhad Samadzadegan et al., "A Multiple Classifier System for Classification of LIDAR Remote Sensing Data Using Multi-class SVM", pp. 254-263 (337 total pages).

Examination Report on EP Appl. Ser. No. 17898933.1 dated May 25, 2022 (5 pages).

Examination Report on EP Appl. Ser. No. 19791789.1 dated Dec. 21, 2021 (12 pages).

Extended European Search Report on EP Appl. Ser. No. 17876081.5 dated Jun. 3, 2020 (9 pages).

(56) References Cited

OTHER PUBLICATIONS

Extended European Search Report on EP Appl. Ser. No. 17876731.5 dated Jun. 17, 2020 (14 pages).

Extended European Search Report on EP Appl. Ser. No. 17888807.9 dated Jun. 3, 2020 (9 pages).

Extended European Search Report on EP Appl. Ser. No. 17898933.1 dated May 12, 2020 (7 pages).

Farhad Samadzadegan et al. "A Multiple Classifier System for Classification of LIDAR Remote Sensing Data Using Multi-class SVM", International Workshop on Multiple Classifier Systems, MCS 2010, Lecture Notes in Computer Science, 2010, vol. 5997, pp. 254-263.

Fehr, D. et al., "Compact Covariance descriptors in 3D point clouds for object recognition," presented at the Robotics and Automation (ICRA), May 14, 2012, IEEE International Conference, pp. 1793-1798.

Final US Office Action on U.S. Appl. No. 17/331,362 dated Nov. 29, 2021 (17 pages).

First Office Action on CN Appl. Ser. No. 201780081215.2 dated Mar. 3, 2021 (14 pages).

First Office Action on CN Appl. Ser. No. 201980033898.3 dated Apr. 20, 2021 (14 pages).

Foucras, M. et al., "Detailed Analysis of the Impact of the Code Doppler on the Acquisition Performance of New GNSS Signals," ION ITM, International Technical Meeting of The Institute of Navigation, San Diego, California, Jan. 27, 2014, pp. 1-13.

Garcia Monreal, J. et al., "Detection of Three Dimensional Objects Based on Phase Encoded Range Images", Sixth International Conference on Correlation Optics, vol. 5477, Jun. 4, 2004, pp. 269-280.

Griggs, R.(Ed.), "Implementation Agreement for Integrated Dual Polarization Micro-Intradyne Coherent Receivers", OIF (Optical Internetworking Forum), IA# OIF-DPC-MRX-01.0, Mar. 31, 2015, pp. 1-32.

Haralick, R. et al., "Image Analysis Using Mathematical Morphology," IEEE Transactions In Pattern Analysis and Machine Intelligence, Jul. 1987, vol. PAMI-9, No. 4, pp. 532-550.

International Preliminary Report and Written Opinion on Patentability on Appl. Ser. No. PCT/US2018/041388 dated Jan. 23, 2020 (12 pages).

International Preliminary Report and Written Opinion on Patentability on Appl. Ser. No. PCT/US2019/028532 dated Oct. 27, 2020 (11 pages).

International Preliminary Report and Written Opinion on Patentability on Appl. Ser. No. PCT/US2019/068351 dated Jul. 15, 2021 (8 pages).

International Search Report and Written Opinion on Appl. Ser. No. PCT/US2017/062703 dated Aug. 27, 2018 (13 pages).

International Search Report and Written Opinion on Appl. Ser. No. PCT/US2017/062708 dated Mar. 16, 2018 (14 pages).

International Search Report and Written Opinion on Appl. Ser. No. PCT/US2017/062714 dated Aug. 23, 2018 (13 pages).

International Search Report and Written Opinion on Appl. Ser. No. PCT/US2017/062721 dated Feb. 6, 2018 (12 pages).

International Search Report and Written Opinion on Appl. Ser. No. PCT/US2018/016632 dated Apr. 24, 2018 (6 pages).

International Search Report and Written Opinion on Appl. Ser. No. PCT/US2018/041388 dated Sep. 20, 2018 (13 pages).

International Search Report and Written Opinion on Appl. Ser. No. PCT/US2018/044007 dated Oct. 25, 2018 (17 pages).

International Search Report and Written Opinion on Appl. Ser. No. PCT/US2019/028532 dated Aug. 16, 2019 (16 pages).

International Search Report and Written Opinion on Appl. Ser. No. PCT/US2019/068351 dated Apr. 9, 2020 (14 pages).

International Search Report and Written Opinion on Appl. Ser. No. PCT/US2021/032515 dated Aug. 3, 2021 (18 pages).

Johnson, A. et al., "Using spin images for efficient object recognition in cluttered 3D scenes", IEEE Trans. Pattern Anal. Mach. Intell., vol. 21, No. 5, May 1999, pp. 433-448.

Johnson, A., "Spin-Images: A Representation for 3-D Surface Matching," doctoral dissertation, tech. report CMU-RI-TR-97-47, Robotics Institute, Carnegie Mellon University, Aug. 1997, 308 pages.

Kachelmyer, A., "Range-Doppler Imaging with a Laser Radar", The Lincoln Laboratory Journal, vol. 3, No. 1, 1990, pp. 87-118.

Klasing, K. et al., "Comparison of Surface Normal Estimation Methods for Range Sensing Applications," 2009 IEEE International Conference on Robotics and Automation, May 12, 2009, pp. 3206-3211.

Korean Office Action issued in connection with KR Appl. Ser. No. 10-2021-7023519 dated Feb. 13, 2023 (15 pages).

Krause, B. et al., "Motion compensated frequency modulated continuous wave 3D coherent imaging ladar with scannerless architecture", Applied Optics, vol. 51, No. 36, Dec. 20, 2012, pp. 8745-8761.

Le, T., "Arbitrary Power Splitting Couplers Based on 3×3 Multimode Interference Structures for All-Optical Computing", LACSIT International Journal of Engineering and Technology, vol. 3, No. 5, Oct. 2011, pp. 565-569.

Lin, C. et al.; "Eigen-feature analysis of weighted covariance matrices for LiDAR point cloud classification", ISPRS Journal of Photogrammetry and Remote Sensing, vol. 94, Aug. 1, 2014 (30 pages).

Lu et al., "Recognizing objects in 3D point clouds with multi-scale features", Sensors 2014, 14, 24156-24173; doi: 10.3390/s141224156 (Year: 2014).

Lu, M. et al., "Recognizing Objects in 3D Point Clouds with Multi-Scale Local Features," Sensors 2014, Dec. 15, 2014, retrieved at URL:www.mdpi.com/1424-8220/14/12/24156/pdf, pp. 24156-24173.

Mackinnon, D. et al., "Adaptive laser range scanning", American Control Conference, Piscataway, NJ, 2008, pp. 3857-3862.

Marron, J. et al., "Three-dimensional Lensless Imaging Using Laser Frequency Diversity", Applied Optics, vol. 31, No. 2, Jan. 10, 1992, pp. 255-262.

Miyasaka, T. et al., "Moving Object Tracking and Identification in Traveling Environment Using High Resolution Laser Radar", Graphic Information Industrial, vol. 43, No. 2, pp. 61-69, Feb. 1, 2011.

Munkres, J., "Algorithms for the Assignment and Transportation Problems", Journal of the Society for Industrial and Applied Mathematics, vol. 5, No. 1, Mar. 1957, pp. 32-38.

Non-Final Office Action on U.S. Appl. No. 17/586,523 dated May 18, 2023 (8 pages).

Non-Final Office Action on U.S. Appl. No. 16/464,648 dated Jun. 1, 2021 (6 pages).

Non-Final Office Action on U.S. Appl. No. 16/464,657 dated Dec. 22, 2021 (17 pages).

Non-Final Office Action on U.S. Appl. No. 16/725,419 dated Feb. 24, 2020 (4 pages).

Notice of Allowance for U.S. Appl. No. 16/725,399 dated Dec. 3, 2020 (11 pages).

Notice of Allowance on KR Appl. Ser. No. 10-2019-7019062 dated Feb. 10, 2021 (4 Pages).

Notice of Allowance on KR Appl. Ser. No. 10-2019-7019076 dated Feb. 15, 2021 (4 pages).

Notice of Allowance on KR Appl. Ser. No. 10-2019-7019078 dated Feb. 15, 2021 (4 pages).

Notice of Allowance on U.S. Appl. No. 17/586,523 dated Aug. 30, 2023 (7 pages).

Notice of Allowance on U.S. Appl. No. 16/464,648 dated Oct. 13, 2021 (7 pages).

Notice of Allowance on U.S. Appl. No. 15/423,978 dated Jul. 15, 2019 (8 pages).

Notice of Allowance U.S. Appl. No. 15/645,311 dated Apr. 18, 2019 (13 pages).

Notice of Allowance on U.S. Appl. No. 16/515,538 dated Feb. 23, 2021 (16 pages).

Notice of Allowance on U.S. Appl. No. 16/725,419 dated Apr. 15, 2020 (9 pages).

Notice of Preliminary Rejection on KR Appl. Ser. No. 10-2021-7014545 dated Aug. 19, 2021 (17 pages).

(56) References Cited

OTHER PUBLICATIONS

Notice of Preliminary Rejection on KR Appl. Ser. No. 10-2021-7014560 dated Aug. 19, 2021 (5 pages).
Notice of Preliminary Rejection on KR Appl. Ser. No. 10-2021-7019744 dated Aug. 19, 2021 (15 pages).
Notice of Reasons for Refusal on JP Appl. Ser. No. 2019-527156 dated Dec. 1, 2020 (12 pages).
Notice of Reasons for Refusal on JP Appl. Ser. No. 2020-559530 dated Apr. 20, 2021 (11 pages).
Notice of Reasons for Refusal on JP Appl. Ser. No. 2021-118743 dated Jun. 7, 2022 (9 pages).
Notice of Reasons for Refusal on JP Appl. Ser. No. 2021-165072 dated Apr. 19, 2022 (10 pages).
Notice of Reasons for Refusal on JP Appl. Ser. No. 2021-165072 dated Nov. 30, 2021 (9 pages).
Notice of Reasons for Refusal on JP Appl. Ser. No. 2021-538998 dated Apr. 26, 2022 (11 pages).
Notice of Reasons for Refusal on JP Appl. Ser. No. 2021-538998 dated Nov. 30, 2021 (20 pages).
Notice of Reasons for Rejection issued in connection with JP Appl. Ser. No. JP 2021-126516 dated Jun. 21, 2022 (16 pages).
Notice of Reasons of Rejection issued in connection with JP Appl. Ser. No. 2022-000212 dated Feb. 7, 2023.
O'Donnell, R., "Radar Systems Engineering Lecture 11 Waveforms and Pulse Compression," IEEE New Hampshire Section, Jan. 1, 2010, pp. 1-58.
Office Action issued in connection with Japanese Appl. No. 2022-569030 dated Aug. 22, 2023 (9 pages).
Office Action on JP App. Ser. No. 2019-527155 dated Dec. 1, 2020 (10 pages).
Office Action on JP Appl. Ser. No. 2019-527155 dated Dec. 1, 2020 (8 pages).
Office Action on JP Appl. Ser. No. 2019-527224 dated Dec. 1, 2020 (6 pages).
Office Action on JP Appl. Ser. No. 2019-538482 dated Feb. 2, 2021 (6 pages).
Office Action on KR Appl. Ser. No. 10-2019-7018575 dated Jun. 23, 2020 (4 pages).
Office Action on KR Appl. Ser. No. 10-2019-7019062 dated Oct. 5, 2020 (6 pages).
Office Action on KR Appl. Ser. No. 10-2019-7019076 dated Jun. 9, 2020 (18 pages).
Office Action on KR Appl. Ser. No. 10-2019-7019078 dated Jun. 9, 2020 (14 pages).
Office Action on KR Appl. Ser. No. 10-2019-7022921 dated Aug. 26, 2020 (6 pages).
Office Action on U.S. Appl. No. 15/423,978 dated Mar. 22, 2019 (6 pages).
Office Action on U.S. Appl. No. 17/331,362 dated Aug. 19, 2021 (17 pages).
Optoplex Corporation, "90 degree Optical Hybrid", Nov. 9, 2016, 2 pages.
Rabb, D. et al., "Multi-transmitter Aperture Synthesis", Optics Express, vol. 18, No. 24, Nov. 22, 2010, pp. 24937-24945.
Roos, P. et al., "Ultrabroadband optical chirp linearization for precision metrology applications", Optics Letters, vol. 34, No. 23, Dec. 1, 2009, pp. 3692-3694.
Salehian, H. et al., "Recursive Estimation of the Stein Center of SPD Matrices and Its Applications", 2013 IEEE International Conference on Computer Vision (ICCV), Dec. 1, 2013, pp. 1793-1800.
Samadzadegan, F. et al., "A Multiple Classifier System for Classification of LIDAR Remote Sensing Data Using Multi-class SVM", Multiple Classifier Systems, 9th International Workshop, MCS 2010, Cairo, Egypt, Apr. 7-9, 2010, pp. 254-263.
Satyan, N. et al., "Precise control of broadband frequency chirps using optoelectronic feedback", Optics Express, vol. 17, No. 18, Aug. 31, 2009, pp. 15991-15999.
Second Office Action for KR Appl. Ser. No. 10-2021-7020076 dated Jun. 30, 2021 (5 pages).
Second Office Action on CN Appl. Ser. No. 201780081968.3 dated May 12, 2021 (7 pages).
Stafford, J. et al., "Holographic aperture ladar with range compression," Journal of the Optical Society of America, vol. 34, No. 5, May 2017, pp. A1-A9.
Supplementary European Search Report on EP Appl. Ser. No. 18748729.3 dated Nov. 20, 2020 (8 pages).
Supplementary European Search Report on EP Appl. Ser. No. 18831205.2 dated Feb. 12, 2021 (7 pages).
Supplementary European Search Report on EP Appl. Ser. No. 19791789.1 dated Dec. 9, 2021 (4 pages).
Third Party Submission on U.S. Appl. No. 16/725,375, filed Jun. 25, 2020 (73 pages).
Tippie, A. et al., "High-resolution synthetic-aperture digital holography with digital phase and pupil correction", Optics Express, vol. 19, No. 13, Jun. 20, 2011, pp. 12027-12038.
Weinmann, M. et al., "Semantic point cloud interpretation based on optimal neighborhoods, relevant features and efficient classifiers", ISPRS Journal of Photogrammetry and Remote Sensing, vol. 105, Feb. 27, 2015, pp. 286-304.
Wikipedia, "Digital-to-analog converter", retrieved from https://en.wikipedia.org/wiki/Digital-to-analog_converter, on Apr. 15, 2017, 7 pages.
Wikipedia, "Field-programmable gate array", retrieved from https://en.wikipedia.org/wiki/Field-programmable_gate_array, on Apr. 15, 2017, 13 pages.
Wikipedia, "In-phase and quadrature components", retrieved from https://en.wikipedia.org/wiki/In-phase_and_quadrature_components, on Jan. 26, 2018, 3 pages.
Wikipedia, "Phase-shift keying", retrieved from https://en.wikipedia.org/wiki/Phase-shift_keying#Binary_phase-shift_keying.28BPSK.29, on Oct. 23, 2016, 9 pages.
Ye, J., "Least Squares Linear Discriminant Analysis", 24th International Conference on Machine Learning, pp. 1087-1093 (as of Nov. 27, 2016).

* cited by examiner

800

Generating a source beam 910

Generating a modulated beam by modulating the source beam based on modulation signals 920

Monitoring the modulation signal and the modulated beam to detect a condition associated with the modulated beam 930

In response to a detection of the condition, controlling input of the modulated beam to an amplifier 940

900

SYSTEMS AND METHODS OF LIDAR SENSOR SYSTEMS HAVING AMPLIFIER PROTECTION CIRCUITS

BACKGROUND

Optical detection of range using lasers, often referenced by a mnemonic, LIDAR (for "light detection and ranging"), also sometimes referred to as "laser RADAR," is used for a variety of applications, including imaging and collision avoidance. LIDAR provides finer scale range resolution with smaller beam sizes than conventional microwave ranging systems, such as radio-wave detection and ranging (RADAR).

SUMMARY

At least one aspect relates to a light detection and ranging (LIDAR) sensor system for a vehicle. The LIDAR system includes a laser source configured to output a source beam; a modulator configured to receive a modulation signal and modulate the source beam based on the modulation signal to produce a modulated beam; an amplifier configured to amplify the modulated beam; and a protection circuit configured to detect, by evaluating at least one of the modulation signal or a parameter of the modulated beam, a condition associated with the modulated beam; and control input of the modulated beam to the amplifier in response to detecting the condition.

At least one aspect relates to an autonomous vehicle control system. The autonomous vehicle control system includes a LIDAR sensor system. The LIDAR sensor system includes a laser source configured to output a source beam; a modulator configured to receive a modulation signal and modulate the source beam based on the modulation signal to produce a modulated beam; an amplifier configured to amplify the modulated beam; and a protection circuit configured to detect, by evaluating at least one of the modulation signal or a parameter of the modulated beam, a condition associated with the modulated beam; and control input of the modulated beam to the amplifier in response to detecting the condition. The autonomous vehicle control system includes one or more processors configured to control operation of the autonomous vehicle based on the detecting of the condition.

At least one aspect relates to an autonomous vehicle. The autonomous vehicle includes a LIDAR sensor system. The LIDAR sensor system includes a laser source configured to output a source beam; a modulator configured to receive a modulation signal and modulate the source beam based on the modulation signal to produce a modulated beam; an amplifier configured to amplify the modulated beam; and a protection circuit configured to detect, by evaluating at least one of the modulation signal or a parameter of the modulated beam, a condition associated with the modulated beam; and control input of the modulated beam to the amplifier in response to detecting the condition. The autonomous vehicle includes a steering system; a braking system; and a vehicle controller including one or more processors configured to control operation of at least one of the steering system or the braking system based on the detecting of the condition.

At least one aspect relates to a method for operating a LIDAR sensor system. The method includes outputting, by a laser source, a source beam; receiving, by a modulator, a modulation signal and modulating the source beam based on the modulation signal to produce a modulated beam; amplifying, by an amplifier, the modulated beam; and detecting, by a protection circuit, based on evaluation of at least one of the modulation signal or a parameter of the modulated beam, a condition associated with the modulated beam; and controlling, by the protection circuit, input of the modulated beam to the amplifier in response to detecting the condition.

Those skilled in the art will appreciate that the summary is illustrative only and is not intended to be in any way limiting. Any of the features described herein may be used with any other features, and any subset of such features can be used in combination according to various embodiments. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

Implementations are illustrated by way of example, and not by way of limitation, in the figures of the accompanying drawings in which like reference numerals refer to similar elements and in which.

DETAILED DESCRIPTION

A LIDAR sensor system can generate and transmit a light beam that an object can reflect or otherwise scatter as a return beam corresponding to the transmitted beam. The LIDAR sensor system can receive the return beam, and process the return beam or characteristics thereof to determine parameters regarding the object such as range and velocity. The LIDAR sensor system can apply various frequency or phase modulations to the transmitted beam, which can facilitate relating the return beam to the transmitted beam in order to determine the parameters regarding the object.

Amplifiers, such as Erbium Doped Fiber Amplifiers (EDFAs) can be used in vehicle LIDAR sensor systems to amplify a light signal. However, various amplifiers including EDFAs can be susceptible to technical deficiencies at high optical power, such as Stimulated Brillouin Scattering (SBS) at high optical power levels (or fluence). For example, when a pulse is missing (e.g., an issue with an electro-optic modulator, etc.), SBS could be initiated. When SBS is present, a system can be more susceptible to damages, particularly in fiber components (e.g., fiber, connectors, EDFA, isolators, etc.).

Systems and methods in accordance with the present disclosure can provide optical and/or electrical protection of the system. For example, the LIDAR sensor systems can include a protection circuit to detect a condition (e.g., a missing signal) associated with a modulated beam and control input of the modulated beam to an amplifier (e.g., EDFA) in response to a detection of the condition. For example, the protection circuit can evaluate at least one of the modulation signal or a parameter of the modulated beam. In response to a detection of the condition, the protection circuit can control an optical attenuator to eliminate the input to the amplifier (e.g., EDFA). By controlling the input to the amplifier in response to a detection of such a condition, damages to the system (e.g., optical components) can be prevented, thereby allowing for reliable operation of the system.

System Environments for Autonomous Vehicles

Figure 1:
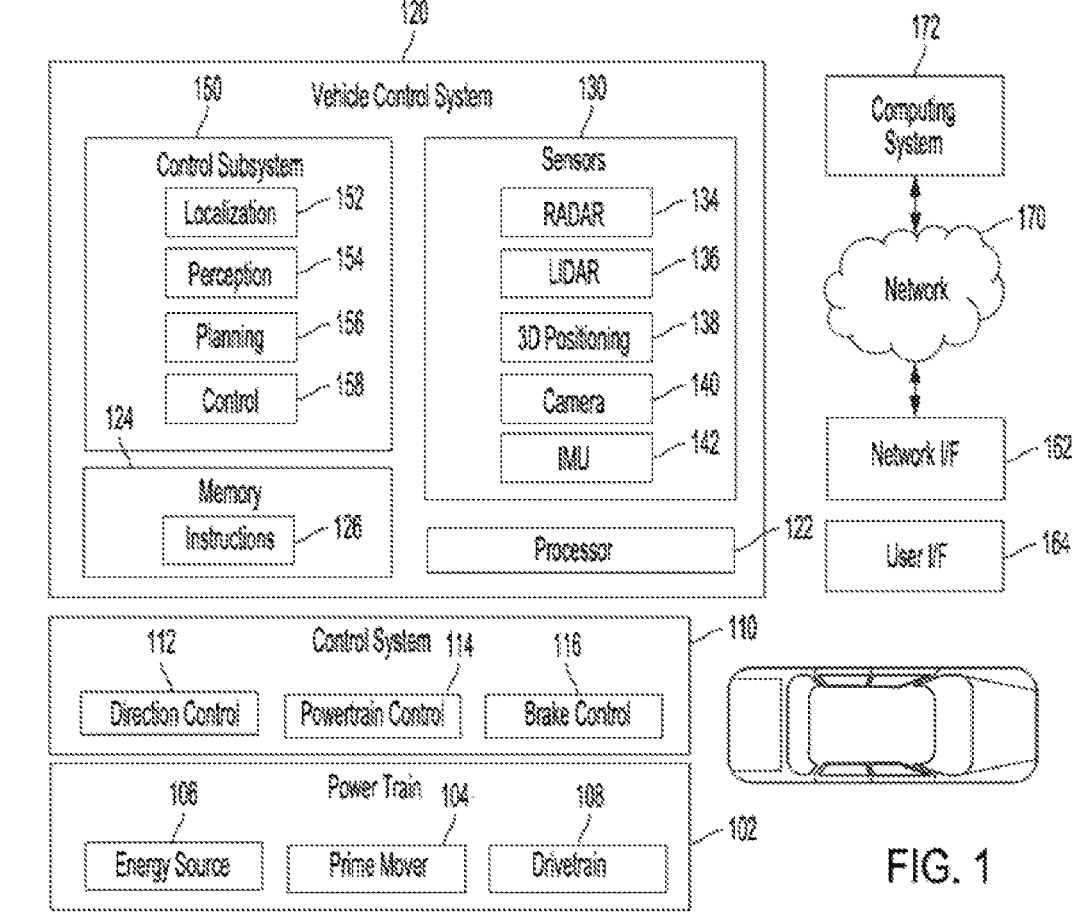
FIG. 1 is a block diagram illustrating an example of a system environment for autonomous vehicles according to some implementations.

FIG. 1 is a block diagram illustrating an example of a system environment for autonomous vehicles according to some implementations. FIG. 1 depicts an example autonomous vehicle 100 within which the various techniques disclosed herein may be implemented. The vehicle 100, for example, may include a powertrain 102 including a prime mover 104 powered by an energy source 106 and capable of providing power to a drivetrain 108, as well as a control system 110 including a direction control 112, a powertrain control 114, and a brake control 116. The vehicle 100 may be implemented as any number of different types of vehicles, including vehicles capable of transporting people and/or cargo, and capable of traveling in various environments. The aforementioned components 102-116 can vary widely based upon the type of vehicle within which these components are utilized, such as a wheeled land vehicle such as a car, van, truck, or bus. The prime mover 104 may include one or more electric motors and/or an internal combustion engine (among others). The energy source may include, for example, a fuel system (e.g., providing gasoline, diesel, hydrogen, etc.), a battery system, solar panels or other renewable energy source, and/or a fuel cell system. The drivetrain 108 can include wheels and/or tires along with a transmission and/or any other mechanical drive components to convert the output of the prime mover 104 into vehicular motion, as well as one or more brakes configured to controllably stop or slow the vehicle 100 and direction or steering components suitable for controlling the trajectory of the vehicle 100 (e.g., a rack and pinion steering linkage enabling one or more wheels of the vehicle 100 to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles), and in some instances multiple electric motors (e.g., dedicated to individual wheels or axles) may be used as a prime mover.

The direction control 112 may include one or more actuators and/or sensors for controlling and receiving feedback from the direction or steering components to enable the vehicle 100 to follow a desired trajectory. The powertrain control 114 may be configured to control the output of the powertrain 102, e.g., to control the output power of the prime mover 104, to control a gear of a transmission in the drivetrain 108, etc., thereby controlling a speed and/or direction of the vehicle 100. The brake control 116 may be configured to control one or more brakes that slow or stop vehicle 100, e.g., disk or drum brakes coupled to the wheels of the vehicle.

Other vehicle types, including but not limited to off-road vehicles, all-terrain or tracked vehicles, construction equipment, may utilize different powertrains, drivetrains, energy sources, direction controls, powertrain controls and brake controls. Moreover, in some implementations, some of the components can be combined, e.g., where directional control of a vehicle is primarily handled by varying an output of one or more prime movers.

Various levels of autonomous control over the vehicle 100 can be implemented in a vehicle control system 120, which may include one or more processors 122 and one or more memories 124, with each processor 122 configured to execute program code instructions 126 stored in a memory 124. The processor(s) can include, for example, graphics processing unit(s) ("GPU(s)") and/or central processing unit(s) ("CPU(s)").

Sensors 130 may include various sensors suitable for collecting information from a vehicle's surrounding environment for use in controlling the operation of the vehicle. For example, sensors 130 can include radar sensor 134, LIDAR (Light Detection and Ranging) sensor 136, a 3D positioning sensors 138, e.g., any of an accelerometer, a gyroscope, a magnetometer, or a satellite navigation system such as GPS (Global Positioning System), GLONASS (Globalnaya Navigazionnaya Sputnikovaya Sistema, or Global Navigation Satellite System), BeiDou Navigation Satellite System (BDS), Galileo, Compass, etc. The 3D positioning sensors 138 can be used to determine the location of the vehicle on the Earth using satellite signals. The sensors 130 can include a camera 140 and/or an IMU (inertial measurement unit) 142. The camera 140 can be a monographic or stereographic camera and can record still and/or video images. The IMU 142 can include multiple gyroscopes and accelerometers capable of detecting linear and rotational motion of the vehicle in three directions. One or more encoders (not illustrated), such as wheel encoders may be used to monitor the rotation of one or more wheels of vehicle 100. Each sensor 130 can output sensor data at various data rates, which may be different than the data rates of other sensors 130.

The outputs of sensors 130 may be provided to a set of control subsystems 150, including a localization subsystem 152, a planning subsystem 156, a perception subsystem 154, and a control subsystem 158. The localization subsystem 152 can perform functions such as precisely determining the location and orientation (also sometimes referred to as "pose") of the vehicle 100 within its surrounding environment, and generally within some frame of reference. The location of an autonomous vehicle can be compared with the location of an additional vehicle in the same environment as part of generating labeled autonomous vehicle data. The perception subsystem 154 can perform functions such as detecting, tracking, determining, and/or identifying objects within the environment surrounding vehicle 100. A machine learning model in accordance with some implementations can be utilized in tracking objects. The planning subsystem 156 can perform functions such as planning a trajectory for vehicle 100 over some timeframe given a desired destination as well as the static and moving objects within the environment. A machine learning model in accordance with some implementations can be utilized in planning a vehicle trajectory. The control subsystem 158 can perform functions such as generating suitable control signals for controlling the various controls in the vehicle control system 120 in order to implement the planned trajectory of the vehicle 100. A machine learning model can be utilized to generate one or more signals to control an autonomous vehicle to implement the planned trajectory.

Multiple sensors of types illustrated in FIG. 1 can be used for redundancy and/or to cover different regions around a vehicle, and other types of sensors may be used. Various types and/or combinations of control subsystems may be used. Some or all of the functionality of a subsystem 152-158 may be implemented with program code instructions 126 resident in one or more memories 124 and executed by one or more processors 122, and these subsystems 152-158 may in some instances be implemented using the same processor(s) and/or memory. Subsystems may be implemented at least in part using various dedicated circuit logic, various processors, various field programmable gate arrays ("FPGA"), various application-specific integrated circuits ("ASIC"), various real time controllers, and the like, as noted above, multiple subsystems may utilize circuitry, processors, sensors, and/or other components. Further, the various components in the vehicle control system 120 may be networked in various manners.

In some implementations, the vehicle 100 may also include a secondary vehicle control system (not illustrated), which may be used as a redundant or backup control system for the vehicle 100. In some implementations, the secondary vehicle control system may be capable of fully operating the autonomous vehicle 100 in the event of an adverse event in the vehicle control system 120, while in other implementations, the secondary vehicle control system may only have limited functionality, e.g., to perform a controlled stop of the vehicle 100 in response to an adverse event detected in the primary vehicle control system 120. In still other implementations, the secondary vehicle control system may be omitted.

Various architectures, including various combinations of software, hardware, circuit logic, sensors, and networks, may be used to implement the various components illustrated in FIG. 1. Each processor may be implemented, for example, as a microprocessor and each memory may represent the random access memory ("RAM") devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in the vehicle 100, e.g., any cache memory in a processor, as well as any storage capacity used as a virtual memory, e.g., as stored on a mass storage device or another computer controller. One or more processors illustrated in FIG. 1, or entirely separate processors, may be used to implement additional functionality in the vehicle 100 outside of the purposes of autonomous control, e.g., to control entertainment systems, to operate doors, lights, convenience features, etc.

In addition, for additional storage, the vehicle 100 may include one or more mass storage devices, e.g., a removable disk drive, a hard disk drive, a direct access storage device ("DASD"), an optical drive (e.g., a CD drive, a DVD drive, etc.), a solid state storage drive ("SSD"), network attached storage, a storage area network, and/or a tape drive, among others.

Furthermore, the vehicle 100 may include a user interface 164 to enable vehicle 100 to receive a number of inputs from and generate outputs for a user or operator, e.g., one or more displays, touchscreens, voice and/or gesture interfaces, buttons and other tactile controls, etc. Otherwise, user input may be received via another computer or electronic device, e.g., via an app on a mobile device or via a web interface.

Moreover, the vehicle 100 may include one or more network interfaces, e.g., network interface 162, suitable for communicating with one or more networks 170 (e.g., a Local Area Network ("LAN"), a wide area network ("WAN"), a wireless network, and/or the Internet, among others) to permit the communication of information with other computers and electronic device, including, for example, a central service, such as a cloud service, from which the vehicle 100 receives environmental and other data for use in autonomous control thereof. Data collected by the one or more sensors 130 can be uploaded to a computing system 172 via the network 170 for additional processing. In some implementations, a time stamp can be added to each instance of vehicle data prior to uploading.

Each processor illustrated in FIG. 1, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 100 via network 170, e.g., in a distributed, cloud-based, or client-server computing environment, whereby the processing required to implement the functions of a computer program may be allocated to multiple computers and/or services over a network.

In general, the routines executed to implement the various implementations described herein, whether implemented as part of an operating system or a specific application, component, program, object, module or sequence of instructions, or even a subset thereof, will be referred to herein as "program code". Program code can include one or more instructions that are resident at various times in various memory and storage devices, and that, when read and executed by one or more processors, perform the steps necessary to execute steps or elements embodying the various aspects of the present disclosure. Moreover, while implementations have and hereinafter will be described in the context of fully functioning computers and systems, it will be appreciated that the various implementations described herein are capable of being distributed as a program product in a variety of forms, and that implementations can be implemented regardless of the particular type of computer readable media used to actually carry out the distribution.

Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.) among others.

In addition, various program code described hereinafter may be identified based upon the application within which it is implemented in a specific implementation. Any particular program nomenclature that follows is used merely for convenience, and thus the present disclosure should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), the present disclosure is not limited to the specific organization and allocation of program functionality described herein.

1. LIDAR for Automotive Applications

Figure 5:
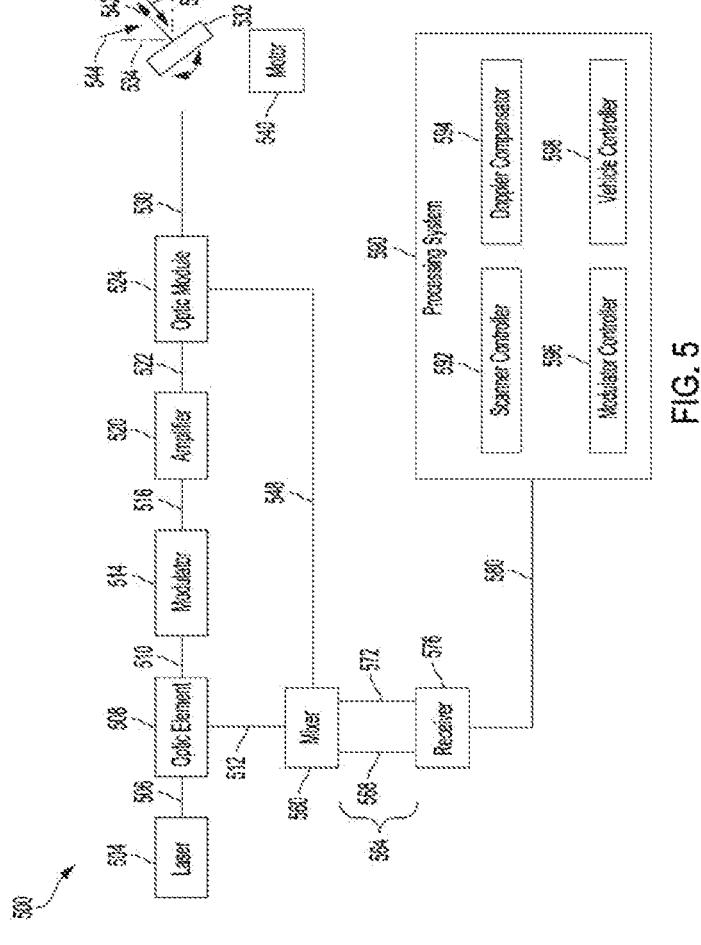
FIG. 5 is a block diagram illustrating an example of a LIDAR sensor system according to some implementations.

A truck can include a LIDAR system (e.g., vehicle control system 120 in FIG. 1, LIDAR sensor system 500 in FIG. 5, among others described herein). In some implementations, the LIDAR sensor system 500 can use frequency modulation to encode an optical signal and scatter the encoded optical signal into free-space using optics. By detecting the frequency differences between the encoded optical signal and a returned signal reflected back from an object, the frequency modulated (FM) LIDAR sensor system can determine the location of the object and/or precisely measure the velocity of the object using the Doppler effect. In some implementations, an FM LIDAR sensor system may use a continuous wave (referred to as, "FMCW LIDAR") or a quasi-continuous wave (referred to as, "FMQW LIDAR"). In some implementations, the LIDAR sensor system can use phase modulation (PM) to encode an optical signal and scatters the encoded optical signal into free-space using optics.

In some instances, an object (e.g., a pedestrian wearing dark clothing) may have a low reflectivity, in that it only reflects back to the sensors (e.g., sensors 130 in FIG. 1) of the FM or PM LIDAR sensor system a low amount (e.g., 10% or less) of the light that hit the object. In other instances, an object (e.g., a shiny road sign) may have a high reflectivity (e.g., above 10%), in that it reflects back to the sensors of the FM LIDAR sensor system a high amount of the light that hit the object.

Regardless of the object's reflectivity, an FM LIDAR sensor system may be able to detect (e.g., classify, recognize, discover, etc.) the object at greater distances (e.g., 2×) than a conventional LIDAR sensor system. For example, an FM LIDAR sensor system may detect a low reflectivity object beyond 300 meters, and a high reflectivity object beyond 400 meters.

To achieve such improvements in detection capability, the FM LIDAR sensor system may use sensors (e.g., sensors 130 in FIG. 1). In some implementations, these sensors can be single photon sensitive, meaning that they can detect the smallest amount of light possible. While an FM LIDAR sensor system may, in some applications, use infrared wavelengths (e.g., 950 nm, 1550 nm, etc.), it is not limited to the infrared wavelength range (e.g., near infrared: 800 nm-1500 nm; middle infrared: 1500 nm-5600 nm; and far infrared: 5600 nm-1,000,000 nm). By operating the FM or PM LIDAR sensor system in infrared wavelengths, the FM or PM LIDAR sensor system can broadcast stronger light pulses or light beams than conventional LIDAR sensor systems.

Thus, by detecting an object at greater distances, an FM LIDAR sensor system may have more time to react to unexpected obstacles. Indeed, even a few milliseconds of extra time could improve response time and comfort, especially with heavy vehicles (e.g., commercial trucking vehicles) that are driving at highway speeds.

The FM LIDAR sensor system can provide accurate velocity for each data point instantaneously. In some implementations, a velocity measurement is accomplished using the Doppler effect which shifts frequency of the light received from the object based at least one of the velocity in the radial direction (e.g., the direction vector between the object detected and the sensor) or the frequency of the laser signal. For example, for velocities encountered in on-road situations where the velocity is less than 100 meters per second (m/s), this shift at a wavelength of 1550 nanometers (nm) amounts to the frequency shift that is less than 130 megahertz (MHz). This frequency shift is small such that it is difficult to detect directly in the optical domain. However, by using coherent detection in FMCW, PMCW, or FMQW LIDAR sensor systems, the signal can be converted to the RF domain such that the frequency shift can be calculated using various signal processing techniques. This enables the autonomous vehicle control system to process incoming data faster.

Instantaneous velocity calculation also makes it easier for the FM LIDAR sensor system to determine distant or sparse data points as objects and/or track how those objects are moving over time. For example, an FM LIDAR sensor (e.g., sensors 130 in FIG. 1) may only receive a few returns (e.g., hits) on an object that is 300 m away, but if those return give a velocity value of interest (e.g., moving towards the vehicle at >70 mph), then the FM LIDAR sensor system and/or the autonomous vehicle control system may determine respective weights to probabilities associated with the objects.

Faster identification and/or tracking of the FM LIDAR sensor system gives an autonomous vehicle control system more time to maneuver a vehicle. A better understanding of how fast objects are moving also allows the autonomous vehicle control system to plan a better reaction.

The FM LIDAR sensor system can have less static compared to conventional LIDAR sensor systems. That is, the conventional LIDAR sensor systems that are designed to be more light-sensitive typically perform poorly in bright sunlight. These systems also tend to suffer from crosstalk (e.g., when sensors get confused by each other's light pulses or light beams) and from self-interference (e.g., when a sensor gets confused by its own previous light pulse or light beam). To overcome these disadvantages, vehicles using the conventional LIDAR sensor systems often need extra hardware, complex software, and/or more computational power to manage this "noise."

In contrast, FM LIDAR sensor systems do not suffer from these types of issues because each sensor is specially designed to respond only to its own light characteristics (e.g., light beams, light waves, light pulses). If the returning light does not match the timing, frequency, and/or wavelength of what was originally transmitted, then the FM sensor can filter (e.g., remove, ignore, etc.) out that data point. As such, FM LIDAR sensor systems produce (e.g., generates, derives, etc.) more accurate data with less hardware or software requirements, enabling smoother driving.

The FM LIDAR sensor system can be easier to scale than conventional LIDAR sensor systems. As more self-driving vehicles (e.g., cars, commercial trucks, etc.) show up on the road, those powered by an FM LIDAR sensor system likely will not have to contend with interference issues from sensor crosstalk. Furthermore, an FM LIDAR sensor system uses less optical peak power than conventional LIDAR sensors. As such, some or all of the optical components for an FM LIDAR can be produced on a single chip, which produces its own benefits, as discussed herein.

Figure 2:
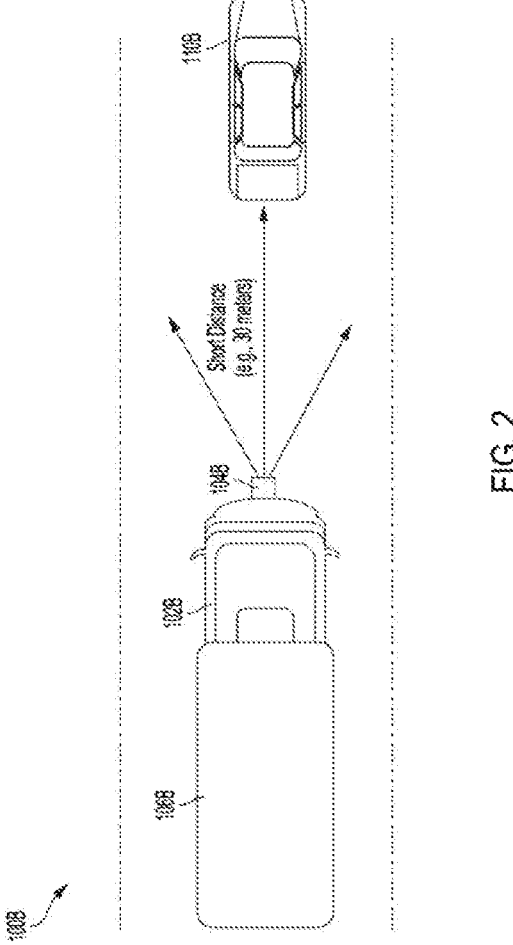
FIG. 2 is a block diagram illustrating an example of a system environment for autonomous commercial trucking vehicles according to some implementations.

FIG. 2 is a block diagram illustrating an example of a system environment for autonomous commercial trucking vehicles, according to some implementations. The environment 100B includes a commercial truck 102B for hauling cargo 106B. In some implementations, the commercial truck 102B may include vehicles configured to long-haul freight transport, regional freight transport, intermodal freight transport (i.e., in which a road-based vehicle is used as one of multiple modes of transportation to move freight), and/or any other road-based freight transport applications. In some implementations, the commercial truck 102B may be a flatbed truck, a refrigerated truck (e.g., a reefer truck), a vented van (e.g., dry van), a moving truck, etc. In some implementations, the cargo 106B may be goods and/or products. In some implementations, the commercial truck 102B may include a trailer to carry the cargo 106B, such as a flatbed trailer, a lowboy trailer, a step deck trailer, an extendable flatbed trailer, a sidekit trailer, etc.

The environment 100B includes an object 110B (shown in FIG. 2 as another vehicle) that is within a distance range that is equal to or less than 30 meters from the truck.

The commercial truck 102B may include a LIDAR sensor system 104B (e.g., an FM LIDAR sensor system, vehicle control system 120 in FIG. 1, LIDAR sensor system 500 in FIG. 5) for determining a distance to the object 110B and/or measuring the velocity of the object 110B. Although FIG. 2 shows that one LIDAR sensor system 104B is mounted on the front of the commercial truck 102B, the number of LIDAR sensor systems and the mounting area of the LIDAR sensor system on the commercial truck are not limited to a particular number or a particular area. The commercial truck 102B may include any number of LIDAR sensor systems 104B (or components thereof, such as sensors, modulators, coherent signal generators, etc.) that are mounted onto any area (e.g., front, back, side, top, bottom, underneath, and/or bottom) of the commercial truck 102B to facilitate the detection of an object in any free-space relative to the commercial truck 102B.

As shown, the LIDAR sensor system 104B in environment 100B may be configured to detect an object (e.g., another vehicle, a bicycle, a tree, street signs, potholes, etc.) at short distances (e.g., 30 meters or less) from the commercial truck 102B.

Figure 3:
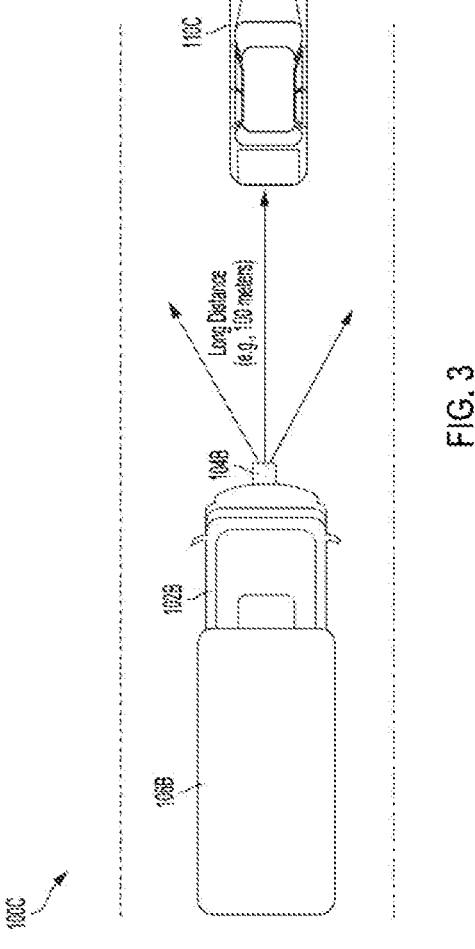
FIG. 3 is a block diagram illustrating an example of a system environment for autonomous commercial trucking vehicles according to some implementations.

FIG. 3 is a block diagram illustrating an example of a system environment for autonomous commercial trucking vehicles, according to some implementations. The environment 100C includes the same components (e.g., commercial truck 102B, cargo 106B, LIDAR sensor system 104B, etc.) that are included in environment 100B.

The environment 100C includes an object 110C (shown in FIG. 3 as another vehicle) that is within a distance range that is (i) more than 30 meters and (ii) equal to or less than 150 meters from the commercial truck 102B. As shown, the LIDAR sensor system 104B in environment 100C may be configured to detect an object (e.g., another vehicle, a bicycle, a tree, street signs, potholes, etc.) at a distance (e.g., 100 meters) from the commercial truck 102B.

Figure 4:
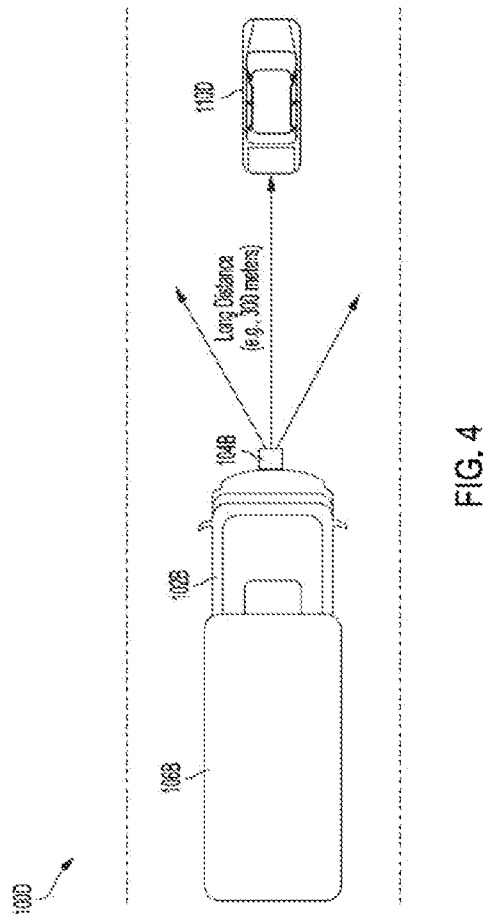
FIG. 4 is a block diagram illustrating an example of a system environment for autonomous commercial trucking vehicles according to some implementations.

FIG. 4 is a block diagram illustrating an example of a system environment for autonomous commercial trucking vehicles, according to some implementations. The environment 100D includes the same components (e.g., commercial truck 102B, cargo 106B, LIDAR sensor system 104B, etc.) that are included in environment 100B.

The environment 100D includes an object 110D (shown in FIG. 4 as another vehicle) that is within a distance range that is more than 150 meters from the commercial truck 102B. As shown, the LIDAR sensor system 104B in environment 100D may be configured to detect an object (e.g., another vehicle, a bicycle, a tree, street signs, potholes, etc.) at a distance (e.g., 300 meters) from the commercial truck 102B.

In commercial trucking applications, it is important to effectively detect objects at all ranges due to the increased weight and, accordingly, longer stopping distance required for such vehicles. FM LIDAR sensor systems (e.g., FMCW and/or FMQW systems) or PM LIDAR sensor systems are well-suited for commercial trucking applications due to the advantages described above. As a result, commercial trucks equipped with such systems may have an enhanced ability to move both people and goods across short or long distances. In various implementations, such FM or PM LIDAR sensor systems can be used in semi-autonomous applications, in which the commercial truck has a driver and some functions of the commercial truck are autonomously operated using the FM or PM LIDAR sensor system, or fully autonomous applications, in which the commercial truck is operated entirely by the FM or LIDAR sensor system, alone or in combination with other vehicle systems.

2. LIDAR Sensor Systems

FIG. 5 is a block diagram illustrating an example of a LIDAR sensor system 500 according to some implementations. The LIDAR sensor system 500 can be used to determine parameters regarding objects, such as range and velocity, and output the parameters to a remote system. For example, the LIDAR sensor system 500 can output the parameters for use by a vehicle controller that can control operation of a vehicle responsive to the received parameters (e.g., vehicle controller 598) or a display that can present a representation of the parameters. The LIDAR sensor system 500 can be a coherent detection system. The LIDAR sensor system 500 can be used to implement various features and components of the systems described with reference to FIGS. 1-4. The LIDAR sensor system 500 can include components for performing various detection approaches, such as to be operated as an amplitude modular LIDAR system or a coherent LIDAR system. The LIDAR sensor system 500 can be used to perform time of flight range determination. In some implementations, various components or combinations of components of the LIDAR sensor system 500, such as laser source 504 and modulator 514, can be in the same housing, provided in the same circuit board or other electronic component, or otherwise integrated. In some implementations, various components or combinations of components of the LIDAR sensor system 500 can be provided as separate components, such as by using optical couplings (e.g., optical fibers) for components that generate and/or receive optical signals, such as light beams, or wired or wireless electronic connections for components that generate and/or receive electrical (e.g., data) signals. Various components of the LIDAR sensor system 500 can be arranged with respect to one another such that light (e.g., beams of light) between the components is directed through free space, such as a space provided by an air (or vacuum) gap, a space that is not through an optical fiber, a space that is free of structural components around a path along which the light is directed (e.g., an empty space at least on the order of millimeters away from a direct line path between the components; an empty space of a size greater than an expected beam width of the light, such as where the light is a collimated beam), or various combinations thereof.

In some implementations, a semiconductor substrate and/or semiconductor package include one or more components of at least one of a transmission (Tx) path or a receiving (Rx) path of the LIDAR sensor system 500. This can include, for example, optical and/or electronic components that can generate heat that may be transferred into the semiconductor substrate and/or semiconductor package during operation. In some implementations, the semiconductor substrate and/or semiconductor package include at least one of silicon photonics circuitry, planar lightwave circuitry (PLC), or III-V semiconductor circuitry.

In some implementations, the optical and/or electronic components formed on or coupled to the semiconductor substrate and/or semiconductor package to perform a plurality of functions in the LIDAR sensor system 500 are collectively referred to as a circuit module. In some implementations, the circuit module includes III-V semiconductor circuitry coupled to at least one of silicon photonics circuitry or PLC. In the present disclosure, "coupling" may refer to a physical connection, an electrical connection, or both, between two components.

In some implementations, a first semiconductor substrate and/or a first semiconductor package include the Tx path and a second semiconductor substrate and/or a second semiconductor package may include the Rx path. In some arrangements, the Rx input/output ports and/or the Tx input/output ports may occur (or be formed/disposed/located/placed) along one or more edges of one or more semiconductor substrates and/or semiconductor packages.

In some implementations, the circuit module include at least one of silicon photonics circuitry, PLC, or III-V semiconductor circuitry in which all of its components (e.g., optical paths, optical amplifiers, phase modulators, etc.) are formed on, disposed over, or otherwise coupled to a single substrate. In some implementations, all of the components of the circuit module are formed on, disposed over, or otherwise coupled to a single layer to form a horizontal structure of an integrated circuit. In some implementations, components of the circuit module are formed on, disposed over, or otherwise coupled to multiple layers stacked on a single substrate to form a vertical structure of an integrated circuit. For example, the circuit module may include phase modulators implemented as one or more PLC modules, optical paths implemented as silicon photonics circuitry, and SOAs implemented as III-V modules, all of which are formed on, disposed over, or otherwise coupled to a single III-V substrate. The III-V semiconductor materials may include at least one of gallium arsenide (GaAs), indium phosphide (InP), indium arsenide (InAs), or combinations thereof.

The LIDAR sensor system 500 can include a laser source 504 that generates and emits a beam 506, such as a carrier wave light beam. An optic element 508 can split the beam 506 into a beam 510 (sometimes referred to as input beam) and a reference beam 512 (e.g., reference signal). In some implementations, any suitable optical, electronic, or optoelectronic elements are used to provide the beam 510 and the reference beam 512 from the laser source 504 to other elements. For example, the optic element 508 can be a splitter or a circulator.

A modulator 514 can modulate one or more properties of the input beam 510 to generate a beam 516 (e.g., target beam) and/or encode information on the input beam 510. In some implementations, the modulator 514 can modulate a frequency of the input beam 510 (e.g., optical frequency corresponding to optical wavelength, where $c=\lambda v$, where c is the speed of light, $\lambda$ is the wavelength, and v is the frequency). For example, the modulator 514 can modulate a frequency of the input beam 510 linearly such that a frequency of the beam 516 increases or decreases linearly over time. As another example, the modulator 514 can modulate a frequency of the input beam 510 non-linearly (e.g., exponentially). In some implementations, the modulator 514 can modulate a phase of the input beam 510 to generate the beam 516. However, the modulation techniques are not limited to the frequency modulation and the phase modulation. Any suitable modulation techniques can be used to modulate one or more properties of a beam. Returning to FIG. 5, the modulator 514 can modulate the beam 510 subsequent to splitting of the beam 506 by the optic element 508, such that the reference beam 512 is unmodulated, or the modulator 514 can modulate the beam 506 and provide a modulated beam to the optic element 508 for the optic element 508 to split into a target beam and a reference beam. In some implementations, the modulator 514 includes a circuit module having at least one of silicon photonics circuitry, PLC, or III-V semiconductor circuitry. In some implementations, the modulator 514 may be a Mach-Zehnder modulator. In some implementations, the modulator 514 can control a pulse of continuous wave operation of the LIDAR sensor system 500. In some implementations, the modulator 514 can control a pulse of quasi continuous wave operation of the LIDAR sensor system 500.

The beam 516, which is used for outputting a transmitted signal, can have most of the energy of the beam 506 outputted by the laser source 504, while the reference beam 512 can have significantly less energy, yet sufficient energy to enable mixing with a return beam 548 (e.g., returned light) scattered from an object. The reference beam 512 can be used as a local oscillator (LO) signal. The reference beam 512 passes through a reference path and can be provided to a mixer 560. An amplifier 520 can amplify the beam 516 to output a beam 522.

The LIDAR sensor system 500 can include an optic module 524, which can receive the beam 522. The optic module 524 can be a free space optic. For example, the optic module 524 can include one or more optics (e.g., lenses, mirrors, waveguides, grating couplers, prisms, waveplates) arranged to have a gap (e.g., air gap) between the one or more optics, allowing for free space transmission of light (e.g., rather than all light being coupled between optics by fibers). The optic module 524 can perform functions such as collimating, filtering, and/or polarizing the beam 522 to output a beam 530 to optics 532 (e.g., scanning optics).

Figure 7:
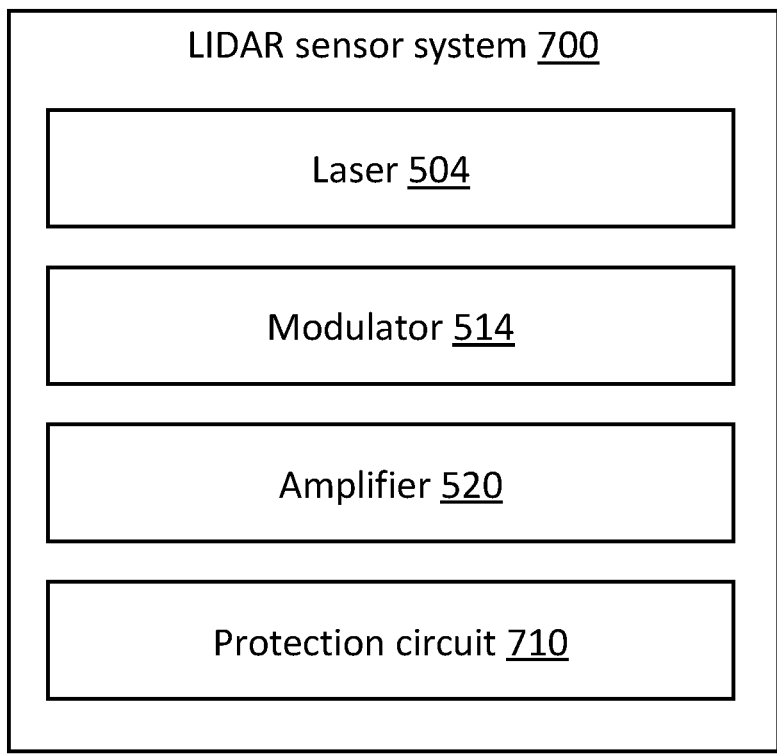
FIG. 7 is a block diagram illustrating an example of a LIDAR sensor system including a protection circuit according to some implementations.
Figure 8:
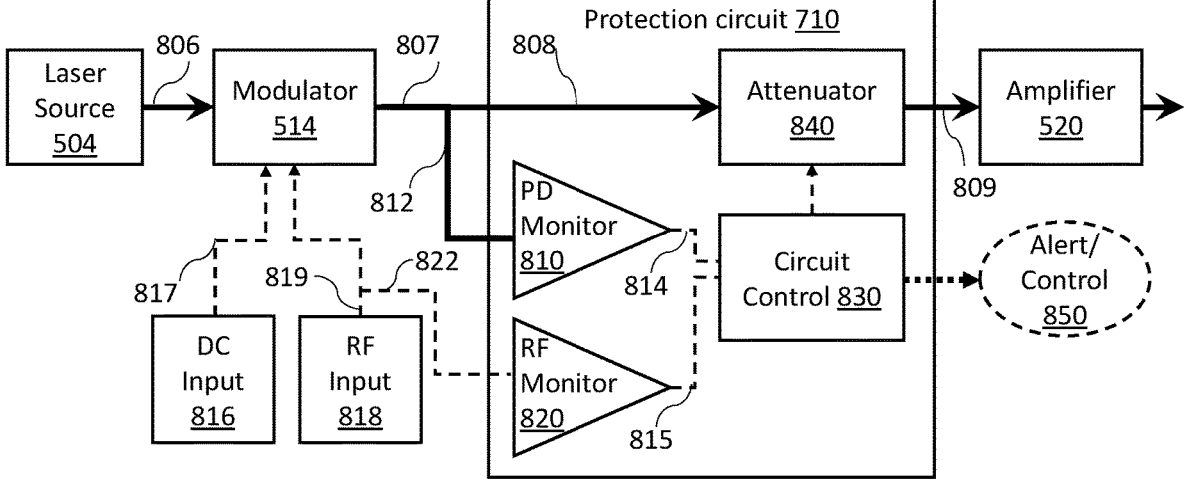
FIG. 8 is a block diagram illustrating an example of a LIDAR sensor system including a protection circuit according to some implementations.

The LIDAR sensor system 500 can include a protection circuit (not shown) as discussed with respect to FIG. 7 and FIG. 8. The protection circuit can be operably coupled to the modulator 514 and the amplifier 520. The protection circuit can detect a condition associated with the beam 516 (e.g., a modulated beam) and control the beam 516 input to the amplifier 520.

Figure 6:
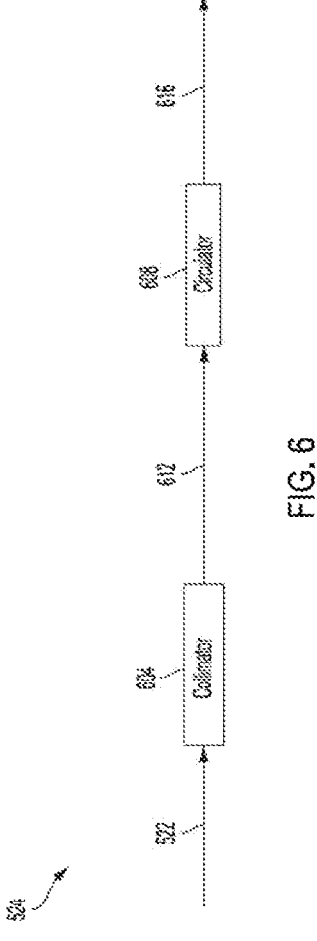
FIG. 6 is a block diagram illustrating an example of an optic module of a LIDAR sensor system according to some implementations.

Referring to FIG. 6, the optic module 524 can include at least one collimator 604 and at least one circulator 608. For example, the circulator 608 can be between the collimator 604 and the optics 532 of FIG. 5. The circulator 608 can receive a collimated beam 612 outputted by the collimator 604 and output a beam 616 (e.g., the beam 530 depicted in FIG. 5) to the optics 532. In some implementations, the circulator 608 can be between the laser source 504 and the collimator 604. At least one of the collimator 604 or the circulator 608 can be free space optics (and can be coupled with one another in free space), such as by being optically coupled via air gaps rather than optical fibers.

Referring further to FIG. 5, the optic module 524 can receive return beam 548 from the optics 532 and provide the return beam 548 to the mixer 560. The optics 532 can be scanning optics, such as one or more steering mirrors or polygon reflectors or deflectors to adjust the angle of received beams relative to outputted beams based on the orientation of outer surfaces (e.g., facets) of the optics relative to the received beam, or solid-state components (e.g., phased arrays, electro-optic crystals) configured to modify the direction of received light.

The optics 532 can define a field of view 544 that corresponds to angles scanned (e.g., swept) by the beam 542 (e.g., a transmitted beam). For example, the beam 542 can be scanned in the particular plane, such as an azimuth plane or elevation plane (e.g., relative to an object to which the LIDAR sensor system 500 is coupled, such as an autonomous vehicle). The optics 532 can be oriented so that the field of view 544 sweeps an azimuthal plane relative to the optics 532.

At least one motor 540 can be coupled with the optics 532 to control at least one of a position or an orientation of the optics 532 relative to the beam 530. For example, where the optics 532 include a mirror, reflector, or deflector, the motor 540 can rotate the optics 532 relative to an axis 534 (e.g., an axis orthogonal to the frame of reference depicted in FIG. 5) so that surfaces of the optics 532 at which the beam 530 is received vary in angle or orientation relative to the beam 530, causing the beam 542 to be varied in angle or direction as the beam 542 is outputted from the optics 532.

The beam 542 can be outputted from the optics 532 and reflected or otherwise scattered by an object (not shown) as a return beam 548 (e.g., return signal). The return beam 548 can be received on a reception path, which can include the circulator 608, and provided to the mixer 560.

The mixer 560 can be an optical hybrid, such as a 90 degree optical hybrid. The mixer 560 can receive the reference beam 512 and the return beam 548, and mix the reference beam 512 and the return beam 548 to output a signal 564 responsive to the reference beam 512 and the return beam 548. The signal 564 can include an in-phase (I) component 568 and a quadrature (Q) component 572.

The LIDAR sensor system 500 can include a receiver 576 that receives the signal 564 from the mixer 560. The receiver 576 can generate a signal 580 responsive to the signal 564, which can be an electronic (e.g., radio frequency) signal. The receiver 576 can include one or more photodetectors that output the signal 580 responsive to the signal 564.

The LIDAR sensor system 500 can include a processing system 590, which can be implemented using features of the vehicle control system 120 described with reference to FIG. 1. The processing system 590 can process data received regarding the return beam 548, such as the signal 580, to determine parameters regarding the object such as range and velocity. The processing system 590 can include a scanner controller 592 that can provide scanning signals to control operation of the optics 532, such as to control the motor 540 to cause the motor 540 to rotate the optics 532 to achieve a target scan pattern, such as a sawtooth scan pattern or step function scan pattern. The processing system 590 can include a Doppler compensator 594 that can determine the sign and size of a Doppler shift associated with processing the return beam 548 and a corrected range based thereon along with any other corrections. The processing system 590 can include a modulator controller 596 that can send one or more electrical signals to drive the modulator 514.

The processing system 590 can include or be communicatively coupled with a vehicle controller 598 to control operation of a vehicle for which the LIDAR sensor system 500 is installed (e.g., to provide complete or semi-autonomous control of the vehicle). For example, the vehicle controller 598 can be implemented by at least one of the LIDAR sensor system 500 or control circuitry of the vehicle. The vehicle controller 598 can control operation of the vehicle responsive to at least one of a range to the object or a velocity of the object determined by the processing system 590. For example, the vehicle controller 598 can transmit a control signal to at least one of a steering system or a braking system of the vehicle to control at least one of speed or direction of the vehicle.

3. Systems and Methods of LIDAR Sensor Systems Having Amplifier Protection Circuits LIDAR sensor systems in accordance with the present disclosure can include a protection circuit, such as to mitigate deleterious effects on amplifiers of the LIDAR sensor used to amplify signals transmitted for determining parameters of objects in an environment around a vehicle, including but not limited to range, velocity, and/or Doppler parameters. Under various such operating conditions for vehicle implementations, it can be useful for the outputted signal (e.g., beam) to be amplified and otherwise modified or controlled in a specific manner in order to achieve target performance with respect to information regarding the environment that can be extracted from a return beam from reflection of the outputted signal. The amplifier can be affected by inputs to the amplifier used to achieve the target performance for the LIDAR sensor system; systems and methods in accordance with the present disclosure can include a protection circuit in the LIDAR sensor system to address such effects. For example, the LIDAR sensor systems can include a protection circuit to detect a condition (e.g., a missing signal) associated with a modulated beam and to control input of the modulated beam to an amplifier (e.g., EDFA) in response to a detection of the condition. For example, the protection circuit can evaluate at least one of the modulation signal or a parameter of the modulated beam. In response to a detection of the condition, the protection circuit can control an optical attenuator to eliminate the input to the amplifier (e.g., EDFA). By controlling the input to the amplifier in response to a detection of such a condition, damages to the system (e.g., optical components) can be prevented, thereby allowing for reliable operation of the LIDAR sensor system, and thus of the autonomous vehicles having the LIDAR sensor system. For example, the protection circuit disclosed herein can provide improvements in controlling autonomous vehicles. In response to a detection of a condition (e.g., a missing signal in the LIDAR system), the protection circuit can generate an indication of the condition. The protection circuit can provide the indication to a vehicle controller, which then can operate the vehicle (e.g., controlling a steering system, a braking system, etc.) based at least on the indication of the condition. This improves stability in operating the LIDAR system, and thus the autonomous vehicles.

FIG. 7 depicts a block diagram illustrating a LIDAR sensor system 700 including a protection circuit 710 according to some implementations. The LIDAR sensor system 700 may be substantially similar to and/or incorporate features of the LIDAR sensor system 500. For example, the LIDAR sensor system 700 includes the laser source 504, the modulator 514, and the amplifier 520. The protection circuit 710 can be operably coupled to the modulator 514 and the amplifier 520. The protection circuit 710 can detect a condition associated with optical signals (e.g., the beam 516, a modulated beam, a modulation signal, etc.). Based on a detection of the condition, the protection circuit 710 can control an input to the amplifier 520.

The amplifier 520 can include a high-power amplifier to amplify a light signal. For example, the amplifier 520 may be a semiconductor amplifier, an Erbium Doped Fiber Amplifier (EDFA), etc. Amplifiers (e.g., EDFAs, high-power amplifiers, etc.) can be damaged when operated at high optical power (or fluence). For example, when a pulse (e.g., a modulated beam generated by the modulator 514, a modulation signal provided to the modulator 514, etc.) is missing, or otherwise an issue occurs in an electro-optic component (e.g., the modulator 514 etc.), Stimulated Brillouin Scattering (SBS) could be initiated. When SBS is present, a system can be more susceptible to damages, particularly in fiber components (e.g., fiber, connectors, EDFA, isolators, etc.).

As discussed in greater detail with respect to FIG. 8, the protection circuit 710 can provide optical and/or electrical protection of the system by detecting a condition (e.g., a missing signal) and controlling an input signal to the amplifier 520 in response to a detection of the condition. For example, the protection circuit 710 can evaluate at least one of the modulation signal or a parameter of the modulated beam. For example, in response to a detection of the condition, the protection circuit 710 can control an optical attenuator to eliminate the input to the amplifier 520. By controlling the input to the amplifier 520 in response to a detection of such a condition, damages to the LIDAR sensor system 700 can be prevented, thereby allowing for reliable operation of the LIDAR sensor system 700. The LIDAR sensor system 700 can be operated in combination with any of the LIDAR sensor systems and the autonomous vehicles discussed with respect to FIG. 1 to FIG. 6. In some implementations, the LIDAR sensor system 700 can be configured for operation using a continuous wave (CW) modulation or a quasi-CW modulation. In some implementations, the LIDAR sensor system 700 can be configured for operation with any range of detecting distances (e.g., about 300 meters, 250 meters, 100 meters, 30 meters, etc.). For example, an amplified beam of the LIDAR sensor system 700 can have a parameter (e.g., a magnitude, a signal strength, a power, an amplitude, etc.) greater than a threshold used to transmit an output beam with sufficient signal strength to at least 250 meters.

FIG. 8 depicts a block diagram illustrating an example of a LIDAR sensor system 800 including the protection circuit 710 according to some implementations. The LIDAR sensor system 800 may be substantially similar to and/or incorporate features of the LIDAR sensor system 500. For example, the LIDAR sensor system 800 as depicted in FIG. 8 includes the laser source 504, the modulator 514, and the amplifier 520. The protection circuit 710 can be operably coupled to the modulator 514 and the amplifier 520 such that a modulated beam from the modulator 514 is transmitted to the amplifier 520 through the protection circuit 710. The protection circuit 710 can include a photodetector (PD) monitor 810, a radio-frequency (RF) monitor 820, a circuit control 830, and an attenuator 840. In some implementations, any of components in the protection circuit 710 and the LIDAR sensor system 800 can be integrated on a chip or an integrated circuit. For example, at least one of the modulator 514, the amplifier 520, at least one of components in the protection circuit 710 can be integrated on a chip or an integrated circuit.

The modulator 514 can receive a beam 806 from the laser source 504 and generate a modulated beam 807. The modulator 514 can include or be connected to a direct-current (DC) input 816, which can provide a DC bias 817 to the modulator 514. The modulator 514 can include or be connected to a radio-frequency (RF) input 818, which can provide an RF modulation signal 819 to the modulator 514. Based on the DC bias 817 and the RF modulation signal 819, the modulator 514 can generate the modulated beam 807.

The photodiode (PD) monitor 810 can monitor the modulated beam 807. For example, the PD monitor 810 can include one or more photodiodes (or other optical-to-electrical conversion components) that can receive the modulated beam 807 or a portion thereof and generate an electrical signal representative of the modulated beam 807 in response to receipt of the modulated beam 807. The PD monitor 810 can be optically coupled to the modulator 514 and can receive a monitoring beam 812 of the modulated beam 807. For example, the modulator 514 can be coupled to an optical splitter (not shown) to split the modulated beam 807 into the monitoring beam 812 and direct a remaining portion of the modulated beam 807 (e.g., portion 808) to the attenuator 840. In some implementations, the modulator 514 can be coupled to a photodiode to monitor the modulated beam 807. For example, a photodiode can be optically coupled to the modulator 514 to monitor the modulated light 807 (e.g., scattering of the modulated light 807, within a fiber or in free space) In response to receipt of the monitoring beam 812, the PD monitor 810 can convert the monitoring beam 812 into an electrical signal 814 (hereinafter, referred to as "PD monitoring signal"). The PD monitor 810 can send the PD monitoring signal 814 to the circuit control 830 for the circuit control 830 to process the PD monitoring signal 814. In some implementations, the PD monitor 810 and the circuit control 830 can be combined/integrated to receive the monitoring beam 812, converting the same, and analyze the PD monitoring signal 814. Based on the analysis, the circuit control 830 can detect a predetermined condition associated with the modulated beam 807. In response to a detection of the predetermined condition, the circuit control 830 can control the attenuator 840 to control input of the modulated beam to the amplifier 520.

The RF monitor 820 can monitor the RF modulation signal 819. For example, the RF monitor 820 can include one or more circuit components (or components for detecting an RF signal) that can receive the RF modulation signal 819 or a portion thereof 822 (hereinafter referred to as a monitoring signal 822) and generate an electrical signal representative of the RF modulation signal 819 in response to receipt of the monitoring signal 822. The RF monitor 820 can be operably coupled to the RF input 818 and can receive the monitoring signal 822 of the RF modulation signal 819. For example, the RF input 818 can be coupled to an RF splitter (not shown) to split the RF modulation signal 819 into the monitoring signal 822 and direct the remaining portion to the modulator 514. In some implementations, the RF input 818 can be coupled to a large impedance direct connection, an RF directional coupler, etc. to provide the RF modulation signal 819 to the modulator 514 and the RF monitor 820. In response to receipt of the monitoring signal 822, the RF monitor 820 can send an RF monitoring signal 815 to the circuit control 830 so that the circuit control 830 analyzes the RF monitoring signal 815. In some implementations, the RF monitor 820 and the circuit control 830 can be combined/integrated to receive the monitoring signal 822 and analyze the RF monitoring signal 815. Based on the analysis, the circuit control 830 can detect a predetermined condition associated with the RF modulation signal 819. In response to a detection of the predetermined condition, the circuit control 830 can control the attenuator 840 to control input of the modulated beam to the amplifier 520.

As discussed above, the circuit control 830 can monitor and analyze the PD monitoring signal 814 and the RF monitoring signal 815 to detect a condition associated with the modulated beam 807. In some examples, the condition may be a predetermined condition including a detection of a missing pulse in the RF modulation signal 819 and/or a missing pulse in the modulated beam 807. The predetermined condition may be associated with any parameter of the RF modulation signal 819 and/or the modulated beam 807. For example, the predetermined condition may be satisfied when any of physical properties (e.g., amplitude, frequency, phase, etc.) of the RF modulation signal 819 and/or the modulated beam 807 is distorted, missing, abnormal, or otherwise different from a preset value. For example, the predetermined condition may be satisfied when any of physical properties (e.g., amplitude, frequency, phase, etc.) of the RF modulation signal 819 and/or the modulated beam 807 is too high or not detected. The circuit control 830 can evaluate at least one parameter associated with the PD monitoring signal 814 and/or at least one parameter associated with the RF monitoring signal 815 to detect the predetermined condition. In some examples, the condition may vary depending on any of the LIDAR sensor system 800 and/or the protection circuit 710. For example, the condition may be met when a parameter associated with the RF modulation signal 819 and/or the modulated beam 807 is below or above a threshold that varies based on settings or moving averages, etc.

In some implementations, the circuit control 830 can detect the condition is satisfied with respect to the RF input 818 and/or the RF modulation signal 819, when the circuit control 830 detects the condition based on analysis of the RF monitoring signal 815. In response, the circuit control 830 can control the attenuator 840. For example, a pulse of the RF modulation signal 819 may be missing, and the circuit control 830 can detect the missed pulse based on analysis of the RF monitoring signal 815. The circuit control 830 can control the attenuator 840 in response to a detection of the missed pulse, before the modulated beam modulated based on the missed pulse enters the amplifier 520.

In some implementations, the circuit control 830 can detect the condition is satisfied with respect to the modulator 514 and/or the modulated beam 807 based on analysis of the PD monitoring signal 814. In response to detection of the condition, the circuit control 830 can control the attenuator 840. For example, a pulse of the modulated beam 807 may be missing, and the circuit control 830 can detect the missed pulse based on analysis of the PD monitoring signal 814. The circuit control 830 can control the attenuator 840 in response to a detection of the missed pulse, before the modulated beam modulated based on the missed pulse enters the amplifier 520.

In some implementations, the circuit control 830 can detect the condition is satisfied with respect to any of the RF input 818, the DC input 816, the RF modulation signal 819, the modulator 514 and/or the modulated beam 807, in response to detection of the condition based on analysis of the PD monitoring signal 814 and the RF monitoring signal 815. In response to the detection of the condition, the circuit control 830 can control the attenuator 840.

In some implementations, the circuit control 830 can compare the PD monitoring signal 814 and the RF monitoring signal 815. Based on a comparison, the circuit control 830 can determine that the condition is satisfied, for example in response to a mismatch between the PD monitoring signal 814 and the RF monitoring signal 815. For example, the PD monitoring signal 814 and the RF monitoring signal 815 may be significantly different in one of parameters (e.g., phase, frequency, amplitude, etc.), and the circuit control 830 can detect the difference and determine that the condition is satisfied with respect to at least one of the modulator 514, the RF input 818, the DC input 816, the modulated beam 807, the RF modulation signal 819, and/or the DC bias

817. In response, the circuit control 830 can control the attenuator 840, before the modulated beam enters the amplifier 520.

The circuit control 830 can control the attenuator 840 to control input of the modulated beam. The attenuator 840 may be or include an optical attenuator, a variable optical attenuator (VOA), a fast VOA, a high-speed variable fiber optical attenuator, or any component configured to attenuate the modulated beam 808, prevent the modulated beam 808 from entering the amplifier 520, or otherwise configured to control/adjust/alter the modulated beam 808. The attenuator 840 can be optically coupled to the modulator 514 and the amplifier 520 such that the attenuator 840 can receive the modulated beam 808, control/alter/adjust/attenuate, etc. at least one parameter (e.g., amplitude) of the modulated beam 808, and direct the beam 809 to the amplifier 520. In some implementations, the attenuator 840 can prevent the modulated beam 808 from entering the amplifier 520. For example, the attenuator 840 can be turned to a maximum attenuation level to entirely eliminate the modulated beam 808 (e.g., the beam 809 not entered to the amplifier 520). In response to a determination that the condition is not met, the attenuator 840 can simply direct the modulated beam 808 (e.g., the beam 809) to the amplifier 520, without taking any operation on the modulated beam 808.

In response to a detection of the condition, the circuit control 830 can control the attenuator 840 fast enough to prevent the modulated beam 808 (the modulated beam 808 satisfying the condition or modulated based on the RF modulation signal 819 satisfying the condition) from entering the amplifier 520. In some implementations, the circuit control 830 can detect the condition with a temporal resolution (e.g., 1 to 100 microseconds). In some implementations, the circuit control 830 can control the attenuator 840 with a temporal resolution (e.g., 1-10 microseconds) in response to a detection of the condition. In some implementations, the protection circuit 710 may include a device configured to operate at a frequency (e.g., 100 MHz) to detect the condition and/or control the attenuator 840. In some implementations, the protection circuit 710 may include a high-power and/or high-frequency semiconductor device configured to operate under high-power and high-frequency conditions. For example, the protection circuit 710 may include but not limited to, an optical amplifier, a polarization rotator, a micro-electromechanical systems (MEMS) (e.g., a MEMS switch), an InP-based attenuator, a Mach-Zehnder switch, etc.

In some implementations, the circuit control 830 can perform an alert/control operation 850. In response to a detection of the condition, the circuit control 830 can control the attenuator 840 and perform the alert/control operation 850. The alert/control operation 850 may include generating an alert indicating the condition and sending to a user, vehicle maintenance service, LIDAR maintenance service, a computing system, etc. The alert/control operation 850 may include sending an indication of the condition to a vehicle controller and controlling, by the vehicle controller, operation of the vehicle based at least on the indication of the condition. For example, the circuit control 830 can send an alert to a vehicle controller in response to a detection of the condition, and the vehicle controller can control operation of the vehicle (e.g., a steering system, a braking system, etc.).

The protection circuit discussed herein (e.g., 710) can provide protection of the LIDAR sensor system (e.g., 700) and reliable operations of the LIDAR sensor system and thus of autonomous vehicles equipped with the same. More specifically, the protection circuit can provide optical and/or electrical protection of the LIDAR sensor system by detecting the condition associated with a modulated beam that may cause damages to the amplifier and/or the LIDAR sensor system and controlling one or more components to adjust and/or eliminate the modulated beam. In addition, the protection circuit can perform an alert/control operation (e.g., 850) to further control the LIDAR sensor system and/or the autonomous vehicle. This prevents damages to the LIDAR sensor system while allowing for reliable operation of the autonomous vehicle as well as the LIDAR sensor system.

Figure 9:
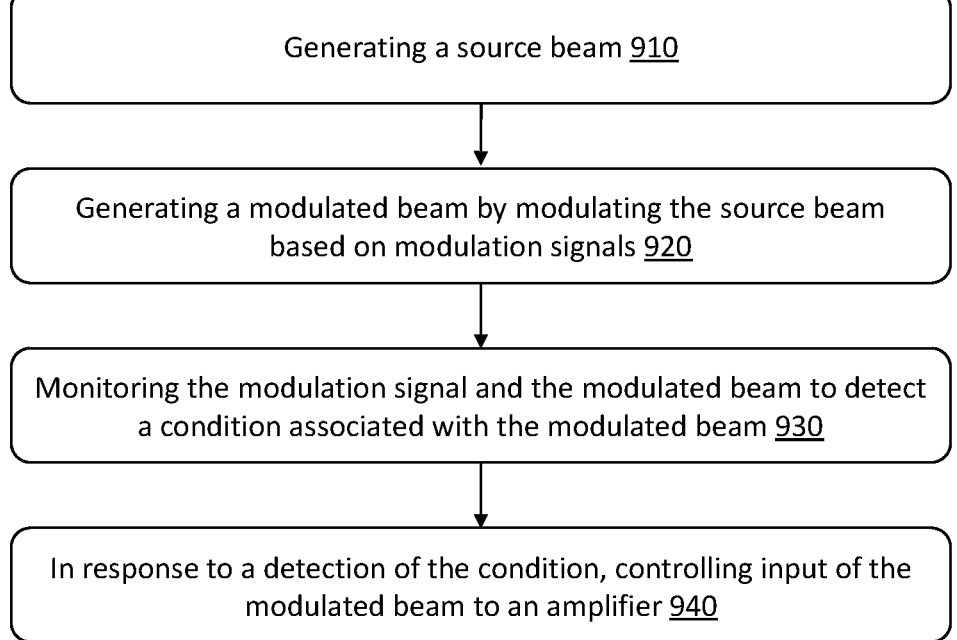
FIG. 9 is a flow diagram showing an example method for operating a LIDAR sensor system including a protection circuit according to some implementations.

FIG. 9 depicts a flow diagram showing an example method 900 for operating a LIDAR sensor system including a protection circuit according to some implementations. The method 900 is merely an example and is not intended to limit the present disclosure. Accordingly, it is understood that additional operations may be provided before, during, and after the method 900. The method 900 can be performed with at least one of components discussed with respect to FIG. 1 to FIG. 8. For example, the method 900 can be performed with the LIDAR sensor system 700 including the protection circuit 710.

At 910, a source beam (e.g., 806) can be generated and directed to a modulator (e.g., 514). The modulator can receive the source beam to generate a modulated beam (e.g., 807). At 920, the modulated beam can be generated by modulating the source beam based on modulation signals (e.g., a DC bias 817, a RF modulation signal 819).

At 930, the modulation signals and the modulated beam can be monitored to detect the condition associated with the modulated beam. The modulation signals can be monitored to detect whether the modulation signals satisfy the condition. The modulated beam can be monitored to detect whether the modulated beam satisfies the condition. The modulated beam can be converted into an electrical signal, which then can be monitored to detect whether the modulated beam satisfies the condition.

At 940, in response to a detection of the condition, input of the modulated beam to an amplifier (e.g., 520) can be controlled. For example, any of parameters (e.g., amplitude) of the modulated beam can be adjusted in response to a detection of the condition. For example, the modulated beam can be entirely eliminated thereby preventing any beam from entering the amplifier, in response to a detection of the condition. In some implementations, at 940, an alert/control operation (e.g., 850) can be further performed in response to a detection of the condition. For example, at 940, the LIDAR sensor system and/or the autonomous vehicle can be controlled in response to a detection of the condition.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

What is claimed:

1. A light detection and ranging (LIDAR) sensor system, comprising:
  a laser source configured to output a source beam;
  a modulator configured to receive a modulation signal and modulate the source beam based on the modulation signal to produce a modulated beam;
  an amplifier configured to amplify the modulated beam; and
  a protection circuit configured to:
    detect, by evaluating at least one of the modulation signal or a parameter of the modulated beam, a condition associated with the modulated beam; and
    control input of the modulated beam to the amplifier in response to detecting the condition.

2. The LIDAR sensor system of claim 1, wherein the protection circuit comprises:
  a first device configured to monitor the modulated beam;
  a second device configured to monitor the modulation signal;
  a third device configured to attenuate the modulated beam or prevent the modulated beam from entering the amplifier; and
  a control circuit coupled to the first device, the second device, and the third device;
  wherein the control circuit is configured to control the third device to control the input of the modulated beam, based on at least one of a first detection from the first device or a second detection from the second device.

3. The LIDAR sensor system of claim 2, wherein the third device is configured to compare the modulation signal and the modulated beam to detect the condition associated with the modulated beam.

4. The LIDAR sensor system of claim 1, wherein:
  the first device is a photodiode monitoring device;

the second device is a radio-frequency monitoring device; and
  the third device is a high speed variable fiber optical attenuator.

5. The LIDAR sensor system of claim 1, wherein the protection circuit is configured to at least one of:
  generate an alert; or
  control the amplifier responsive to a detection of the condition.

6. The LIDAR sensor system of claim 1, wherein the condition indicates that at least one of the modulation signal or the modulated beam is missing.

7. The LIDAR sensor system of claim 1, wherein the amplifier is a high-power amplifier.

8. The LIDAR sensor system of claim 7, wherein the high-power amplifier is an Erbium doped fiber amplifier (EDFA).

9. The LIDAR sensor system of claim 1, wherein the modulator is configured to modulate at least one of a phase or a frequency of the source beam.

10. The LIDAR sensor system of claim 1, wherein at least one of the modulator or the amplifier is integrated on a chip or an integrated circuit.

11. The LIDAR sensor system of claim 1, wherein:
  the protection circuit includes a device configured to operate at 100 MHz;
  the protection circuit is configured to detect the condition with a temporal resolution of 1 to 100 microseconds; or
  the protection circuit is configured to control the input of the modulated beam with a temporal resolution of 1 to 10 microseconds.

12. The LIDAR sensor system of claim 1, wherein a power of the modulated beam is greater than a threshold used to transmit an output beam with sufficient signal strength to at least 250 meters.

13. The LIDAR sensor system of claim 1, wherein the LIDAR sensor system is configured to operate using a continuous wave (CW) modulation or a quasi-CW modulation.

14. The LIDAR sensor system of claim 1, wherein the protection circuit includes at least one of: a polarization rotator, a micro-electromechanical switch, an optical amplifier, or an InP based attenuator.

15. An autonomous vehicle control system, comprising:
  a LIDAR sensor system, comprising:
    a laser source configured to output a source beam;
    a modulator configured to receive a modulation signal and modulate the source beam based on the modulation signal to produce a modulated beam;
    an amplifier configured to amplify the modulated beam; and
    a protection circuit configured to:
      detect, by evaluating at least one of the modulation signal or a parameter of the modulated beam, a condition associated with the modulated beam; and
      control input of the modulated beam to the amplifier in response to detecting the condition; and
  one or more processors configured to control operation of the autonomous vehicle based on the detecting of the condition.

16. The autonomous vehicle control system of claim 15, wherein the protection circuit comprises:
  a first device configured to monitor the modulated beam;
  a second device configured to monitor the modulation signal; and a third device configured to attenuate the modulated beam or prevent the modulated beam from entering the amplifier; and a control circuit coupled to the first device, the second device, and the third device;

wherein the control circuit is configured to control the third device to control the input of the modulated beam, based on at least one of a first detection from the first device or a second detection from the second device.

17. The autonomous vehicle control system of claim 16, wherein:

the first device is a photodiode monitoring device;

the second device is a radio-frequency monitoring device; and the third device is a high speed variable fiber optical attenuator.

18. An autonomous vehicle, comprising:

a LIDAR sensor system, comprising:

a laser source configured to output a source beam;

a modulator configured to receive a modulation signal and modulate the source beam based on the modulation signal to produce a modulated beam;

an amplifier configured to amplify the modulated beam; and a protection circuit configured to:

detect, by evaluating at least one of the modulation signal or a parameter of the modulated beam, a condition associated with the modulated beam; and control input of the modulated beam to the amplifier in response to detecting the condition;

a steering system;

a braking system; and a vehicle controller comprising one or more processors configured to control operation of at least one of the steering system or the braking system based on the detecting of the condition.

19. The autonomous vehicle of claim 18, wherein the condition indicates that at least one of the modulation signal or the modulated beam is missing.

20. The autonomous vehicle of claim 18, wherein the amplifier is an Erbium doped fiber amplifier (EDFA).

* * * * *